(12) United States Patent
Shikata

(10) Patent No.: US 8,013,637 B2
(45) Date of Patent: Sep. 6, 2011

(54) CLOCK SIGNAL SELECTION CIRCUIT

(75) Inventor: Takashi Shikata, Kawasaki (JP)

(73) Assignee: Fujitsu Semiconductor Limited, Yokohama (JP)

(*) Notice: Subject to any disclaimer, the term of this patent is extended or adjusted under 35 U.S.C. 154(b) by 0 days.

(21) Appl. No.: 12/559,896

(22) Filed: Sep. 15, 2009

(65) Prior Publication Data
US 2010/0001767 A1 Jan. 7, 2010

Related U.S. Application Data

(63) Continuation of application No. PCT/JP2007/055757, filed on Mar. 20, 2007.

(51) Int. Cl.
*H03K 17/00* (2006.01)
*G06F 1/08* (2006.01)

(52) U.S. Cl. ............... 327/99; 326/93; 326/96; 375/354

(58) Field of Classification Search .................... 327/99; 375/354
See application file for complete search history.

(56) References Cited

U.S. PATENT DOCUMENTS

| | | | |
|---|---|---|---|
| 5,357,146 A * | 10/1994 | Heimann | 327/292 |
| 6,275,546 B1 | 8/2001 | Miller et al. | |
| 7,003,683 B2 * | 2/2006 | Muroor | 713/500 |
| 7,046,047 B2 | 5/2006 | Daijo | |
| 7,471,120 B2 * | 12/2008 | Lou | 327/99 |
| 2005/0140398 A1 | 6/2005 | Daijo | |

FOREIGN PATENT DOCUMENTS

| | | |
|---|---|---|
| JP | 63-016318 A | 1/1988 |
| JP | 63-35127 U | 3/1988 |
| JP | 1-290013 A | 11/1989 |
| JP | 6-244692 A | 9/1994 |
| JP | 8-330915 A | 12/1996 |
| JP | 2000-138568 A | 5/2000 |
| JP | 2005-026757 A | 1/2005 |
| JP | 2005-191877 A | 7/2005 |

OTHER PUBLICATIONS

"Japanese Office Action" mailed by JPO and corresponding to Japanese application No. 2009505045 on Apr. 19, 2011, with partial English translation.

* cited by examiner

*Primary Examiner* — Lincoln Donovan
*Assistant Examiner* — John W Poos
(74) *Attorney, Agent, or Firm* — Fujitsu Patent Center

(57) ABSTRACT

There is provided a clock signal selection circuit including: a first AND circuit (AND_A1) outputting a logical product signal of a clock selection signal and a first control signal; second AND circuit (AND_A2) outputting a logical product signal of a logical inversion signal of the clock selection signal and a second control signal; a first flip-flop (FF_A2) inputting either the logical product signal that the first AND circuit outputs or a signal in accordance with the logical product signal, and outputting a logical inversion signal of a first output signal in synchronization with a first clock signal to the second AND circuit as the second control signal; and a second flip-flop (FF_B2) inputting either the logical product signal that the second AND circuit outputs or a signal in accordance with the logical product signal, and outputting a logical inversion signal of a second output signal in synchronization with a second clock signal to the first AND circuit as the first control signal.

16 Claims, 20 Drawing Sheets

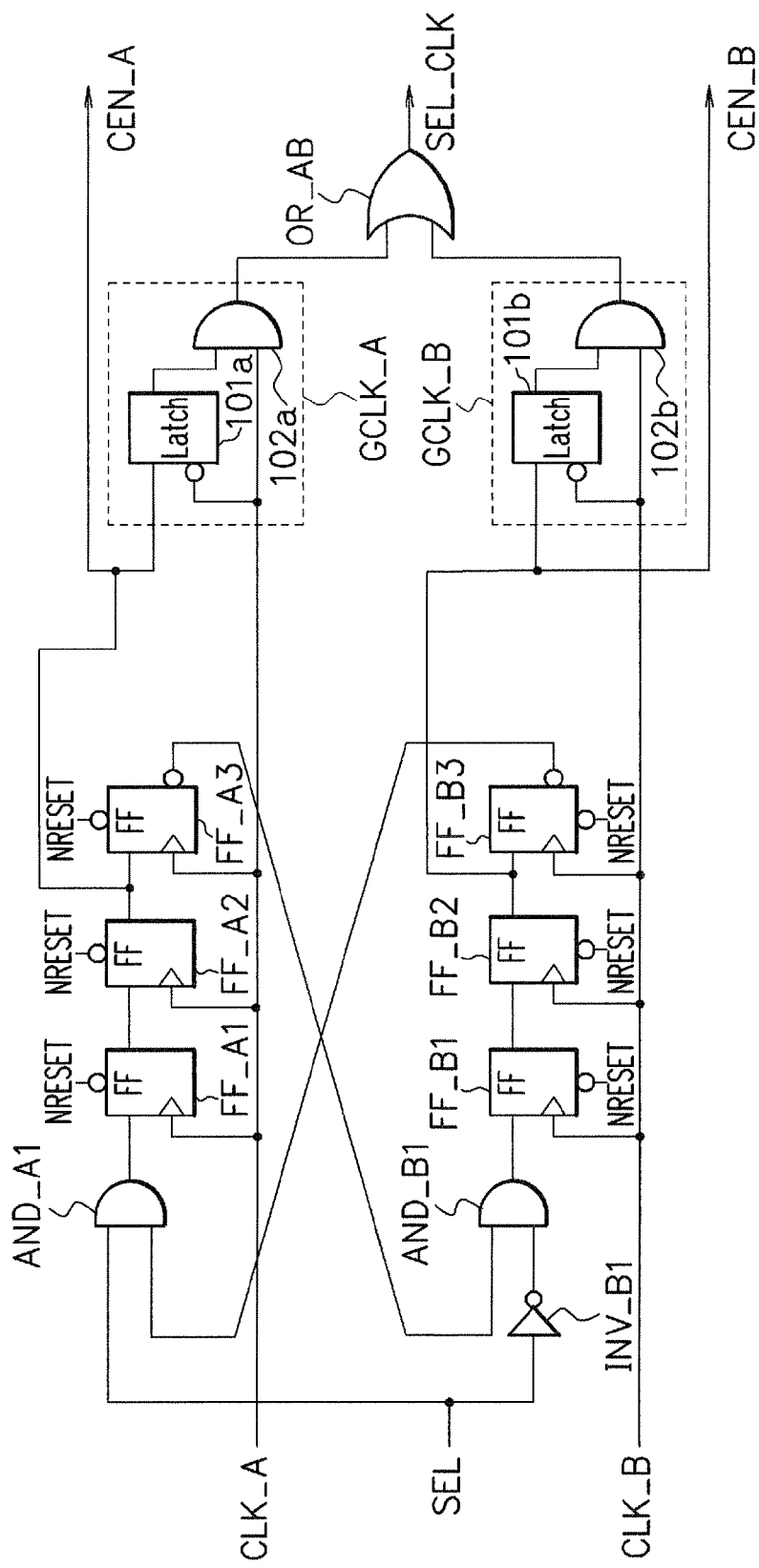
F I G. 7

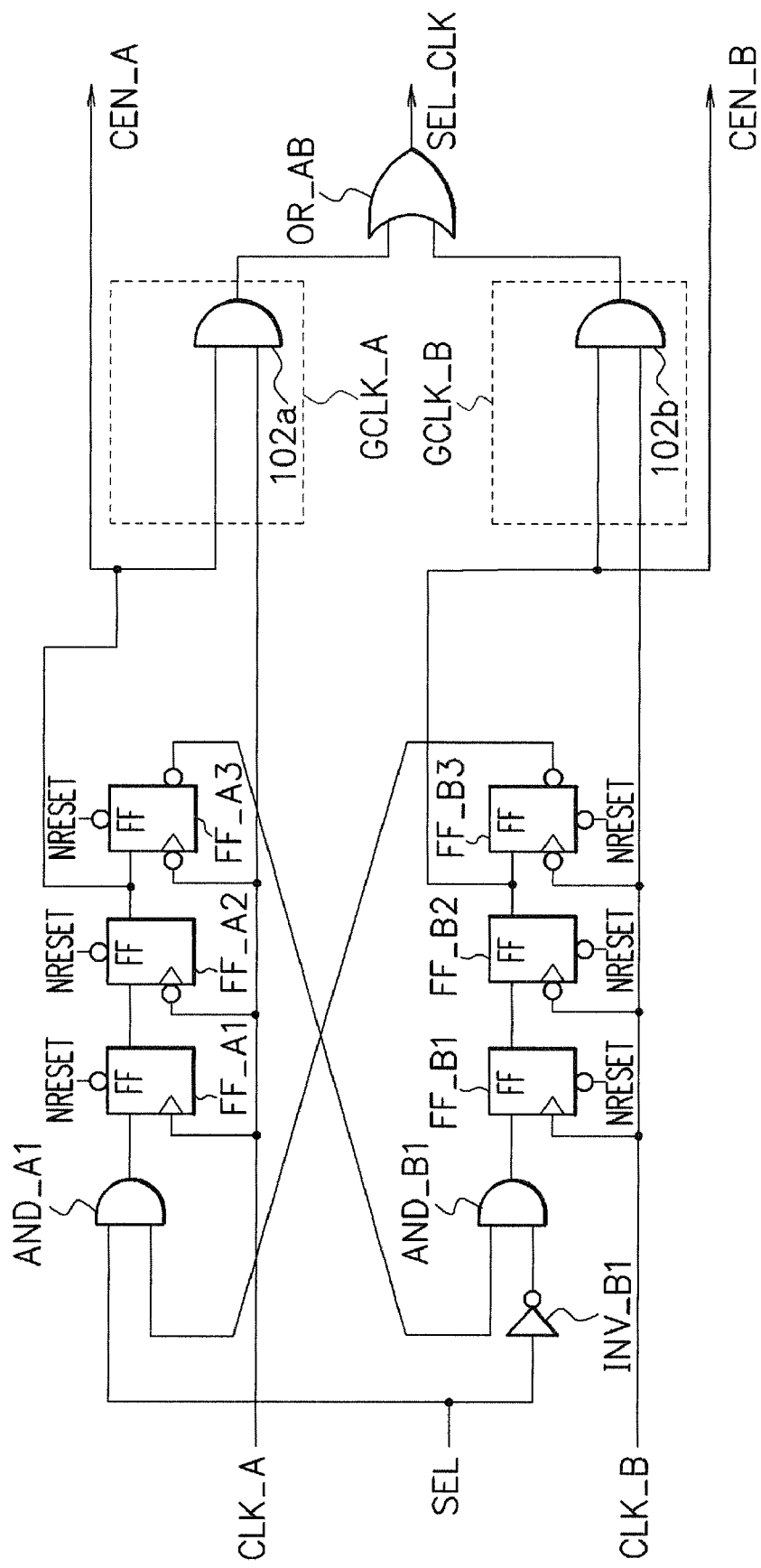
F I G. 8

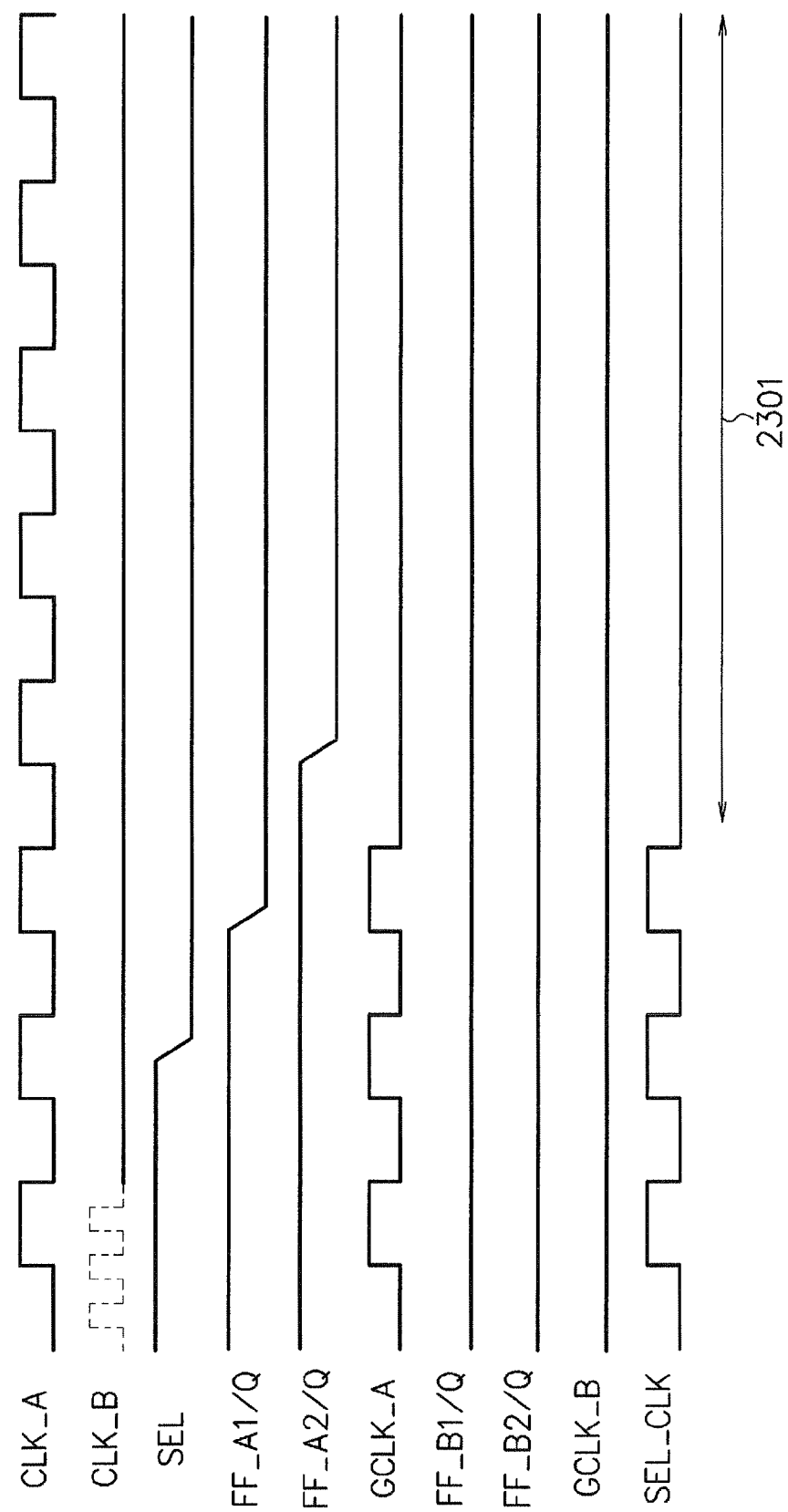

CLOCK SIGNAL SELECTION CIRCUIT

CROSS-REFERENCE TO RELATED APPLICATIONS

This application is a Continuation of International Application No. PCT/JP2007/055757, with an international filing date of Mar. 20, 2007, which designating the United States of America, the entire contents of which are incorporated herein by reference.

FIELD

The present inventions relate to a clock signal selection circuit, in particular to a clock signal selection circuit selecting a clock signal in accordance with a clock selection signal.

BACKGROUND

In recent years, there has been used a technique controlling a frequency of a clock signal dynamically in order to reduce power consumption of an LSI. The technique used often is to change a dividing ratio of a clock frequency, which is called a clock-gear in general, and the technique switching the clock frequency to an equal multiple, ½ times, ¼ times, or the like has been used.

Then, in order to reduce the power consumption further, when performing low-speed operation, output of a PLL circuit is switched from a high-speed clock to a low-speed clock that bypasses the PLL (its frequency and its phase are different), and a minimum frequency in accordance with a CPU processing load is controlled dynamically, and therefore output clocks of the plural PLL circuits are selected dynamically.

However, there is a case where a clock signal having a short pulse width called a glitch is output to output of a selector when asynchronous clock signals whose operating frequency is different from each other are selected dynamically in a normal selector, and there is a possibility of causing an erroneous operation. The glitch is also called a hazard.

FIG. 15 is a circuit diagram depicting a configuration example of a clock signal selection circuit. FIG. 16 is a timing chart depicting an operation thereof. A selector 1501 selects either a first clock signal CLK_A or a second clock signal CLK_B in accordance with a clock selection signal SEL to output a clock signal SEL_CLK. As for the clock signal SEL_CLK, the first clock signal CLK_A is selected when the clock selection signal SEL is a high level, and the second clock signal CLK_B is selected when the clock selection signal SEL is a low level. However, at the time of switching of the clock selection signal SEL, there is a case where a clock having a short pulse width called a glitch 1601 occurs in the clock signal SEL_CLK, and there is a possibility that a CPU using the clock signal SEL_CLK or the like causes an erroneous operation.

FIG. 17 is a circuit diagram depicting a configuration example of another clock signal selection circuit. A phase locked-loop (PLL) circuit 1701 inputs a clock signal CLK and outputs a clock signal whose frequency is higher than that of the clock signal CLK. A selector 1702 selects either the clock signal that the PLL circuit 1701 outputs or the clock signal CLK in accordance with the clock selection signal SEL to output the clock signal SEL_CLK.

FIG. 18 is a circuit diagram depicting a configuration example of another clock signal selection circuit. A first PLL circuit 1801 inputs the first clock signal CLK_A and outputs a clock signal whose frequency is higher than that of the first clock signal CLK_A. A second PLL circuit 1802 inputs the second clock signal CLK_B and outputs a clock signal whose frequency is higher than that of the second clock signal CLK_B. A selector 1803 selects the clock signal that either the PLL circuit 1801 or the PLL circuit 1802 outputs in accordance with the clock selection signal SEL to output the clock signal SEL_CLK.

FIG. 19 is a circuit diagram depicting a configuration example of another clock signal selection circuit. A first PLL circuit 1901 inputs the first clock signal CLK_A and outputs a clock signal whose frequency is higher than that of the first clock signal CLK_A. A second PLL circuit 1902 inputs the second clock signal CLK_B and outputs a clock signal whose frequency is higher than that of the second clock signal CLK_B. A selector 1903 selects either the clock signal that the PLL circuit 1901 outputs or the first clock signal CLK_A in accordance with a clock selection signal SEL0 to output a clock signal. A selector 1904 selects the clock signal that either the selector 1903 or the PLL circuit 1902 outputs in accordance with a clock selection signal SEL1 to output a clock signal CPU1_CLK to a first CPU (a central processing unit) 1907. A selector 1905 selects the clock signal that either the selector 1903 or the PLL circuit 1902 outputs in accordance with a clock selection signal SEL2 to output a clock signal CPU2_CLK to a second CPU 1908. A selector 1906 selects the clock signal that either the selector 1903 or the PLL circuit 1902 outputs in accordance with a clock selection signal SEL3 to output a clock signal CPU3_CLK to a third CPU 1909. The CPUs 1907 to 1909 can write the clock selection signals SEL0 to SEL3 in a clock control register 1911 through a bus 1910. The register 1911 outputs the clock selection signals SEL0 to SEL3 to the selectors 1903 to 1906. The CPUs 1907 to 1909 can set the clock signals CPU1_CLK to CPU3_CLK different from one another, and therefore it is difficult to comprehend a frequency of its own current clock signal.

FIG. 20 is a circuit diagram depicting a configuration example of another clock signal selection circuit. FIG. 21 and FIG. 22 are timing charts depicting an operation thereof. There are depicted, in the order from the top, the first clock signal CLK_A, the second clock signal CLK_B, the clock selection signal SEL, an output signal FF_A1/Q from a flip-flop FF_A1, an output signal FF_A2/Q from a flip-flop FF_A2, an output signal from a gated clock buffer GCLK_A, an output signal FF_B1/Q from a flip-flop FF_B1, an output signal FF_B2/Q from a flip-flop FF_B2, an output signal from a gated clock buffer GCLK_B and the clock signal SEL_CLK in FIG. 21.

The flip-flop FF_A1 inputs the clock selection signal SEL to output a signal in synchronization with the first clock signal CLK_A. The flip-flop FF_A2 inputs the output signal from the flip-flop FF_A1 to output a signal in synchronization with the first clock signal CLK_A. The flip-flops FF_A1 and FF_A2 are preset to hold a high level at the time of initialization. The clock selection signal SEL is an asynchronous signal with respect to the first clock signal CLK_A, and therefore the flip-flop FF_A1 has a possibility of outputting an indefinite value. Even when the flip-flop FF_A1 outputs the indefinite value, the flip-flop FF_A2 can determine an output value and prevent the indefinite value from propagating to a subsequent stage.

The gated clock buffer GCLK_A is a latch-type gated clock buffer, and has a latch circuit 101a and an AND circuit 102a. As depicted in FIG. 22, the latch circuit 101a inputs the output signal from the flip-flop FF_A2 as a signal LT1, and outputs the input signal LT1 as an output signal LT2 as it is when the first clock signal CLK_A is a low level. When the first clock signal CLK_A is a high level, the latch circuit 101a holds the output signal LT2 in a previous state to output it. The AND circuit 102a outputs a logical product signal of the output signal LT2 from the latch circuit 101a and the first clock signal CLK_A.

Here, in the case when the latch circuit 101a in the gated clock buffer GCLK_A does not exist, the AND circuit 102a outputs a logical product signal AND1 of the signal LT1 and the clock signal CLK_A depicted in FIG. 22. This logical product signal AND1 has a faster timing of a pulse than that of the signal GCLK_A, and therefore a condition of set up time becomes severe. Providing the latch circuit 101a delays the timing of the pulse of the signal GCLK_A, and therefore the condition of set up time can be loosened.

An inverter INV_B1 outputs a logical inversion signal of the clock selection signal SEL. The flip-flop FF_B1 inputs the output signal from the inverter INV_B1 to output a signal in synchronization with the second clock signal CLK_B. The flip-flop FF_B2 inputs the output signal from the flip-flop FF_B1 to output a signal in synchronization with the second clock signal CLK_B. The flip-flops FF_B1 and FF_B2 are reset to hold a low level at the time of initialization. The clock selection signal SEL is an asynchronous signal with respect to the second clock signal CLK_B, and therefore the flip-flop FF_B1 has a possibility of outputting an indefinite value. Even when the flip-flop FF_B1 outputs the indefinite value, the flip-flop FF_B2 can determine an output value and prevent the indefinite value from propagating to a subsequent stage.

The gated clock buffer GCLK_B is a latch-type gated clock buffer, and has a latch circuit 101b and an AND circuit 102b. Similar to the gated clock buffer GCLK_A, the latch circuit 101b inputs the output signal from the flip-flop FF_B2, and outputs the input signal as an output signal as it is when the second clock signal CLK_B is a low level. When the second clock signal CLK_B is a high level, the latch circuit 101b holds the output signal in a previous state to output it. The AND circuit 102b outputs a logical product signal of the output signal from the latch circuit 101b and the second clock signal CLK_B.

An OR circuit OR_AB outputs a logical sum signal of the output signals from the AND circuits 102a and 102b as the clock signal SEL_CLK. When the clock selection signal SEL is made to be a high level, the first clock signal CLK_A can be selected to output the clock signal SEL_CLK. On the contrary, when the clock selection signal SEL is made to be a low level, the second clock signal CLK_B can be selected to output the clock signal SEL_CLK. However, immediately after the clock selection signal SEL becomes a low level, the clock signal SEL_CLK becomes a signal in which the first clock signal CLK_A and the second clock signal CLK_B are mixed, and thereby glitches 2101 and 2102 occur resulting in an erroneous operation.

FIG. 23 is another timing chart depicting the operation of the clock signal selection circuit in FIG. 20. The case when the second clock signal CLK_B is stopped will be explained. In this case, when the clock selection signal SEL is switched to a low level, a clock stopped period 2301 occurs in the clock signal SEL_CLK, which is not preferred.

Further, as a clock switching circuit, there have been suggested arts described below.

In Japanese Laid-open Patent Publication No. 2005-191877, when output is switched from a first input clock signal to a second input clock signal, based on an output signal from a first flip-flop group in which an inverted signal of a selection signal is fetched in response to the first input clock signal, an output prohibition period of the first input clock signal is started.

In Japanese Laid-open Patent Publication No. 2000-138568, although a clock signal to be output is selected by a selection signal, a switching timing is controlled by a handshake signal in synchronization with each clock signal thereby preventing interruption in the course of a pulse.

SUMMARY

According to one aspect of the present invention, there is provided a clock signal selection circuit including: a first AND circuit outputting a logical product signal of a clock selection signal and a first control signal; a second AND circuit outputting a logical product signal of a logical inversion signal of the clock selection signal and a second control signal; a first flip-flop inputting either the logical product signal that the first AND circuit outputs or a signal in accordance with the logical product signal, and outputting a logical inversion signal of a first output signal in synchronization with a first clock signal to the second AND circuit as the second control signal; a first gated clock buffer inputting either the input signal to the first flip-flop or a signal in accordance with the input signal, and gate-controlling the input signal by the first clock signal to output a third clock signal; a second flip-flop inputting either the logical product signal that the second AND circuit outputs or a signal in accordance with the logical product signal, and outputting a logical inversion signal of a second output signal in synchronization with a second clock signal to the first AND circuit as the first control signal; a second gated clock buffer inputting either the input signal to the second flip-flop or a signal in accordance with the input signal, and gate-controlling the input signal by the second clock signal to output a fourth clock signal; and a first OR circuit outputting a logical sum signal of the third and fourth clock signals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a circuit diagram depicting a configuration example of a clock signal selection circuit according to a third embodiment;

FIG. 8 is a circuit diagram depicting a configuration example of a clock signal selection circuit according to a fourth embodiment;

FIG. 23 is a timing chart depicting an operation of the clock signal selection circuit in FIG. 20.

DESCRIPTION OF EMBODIMENTS

First Embodiment

Figure 1:
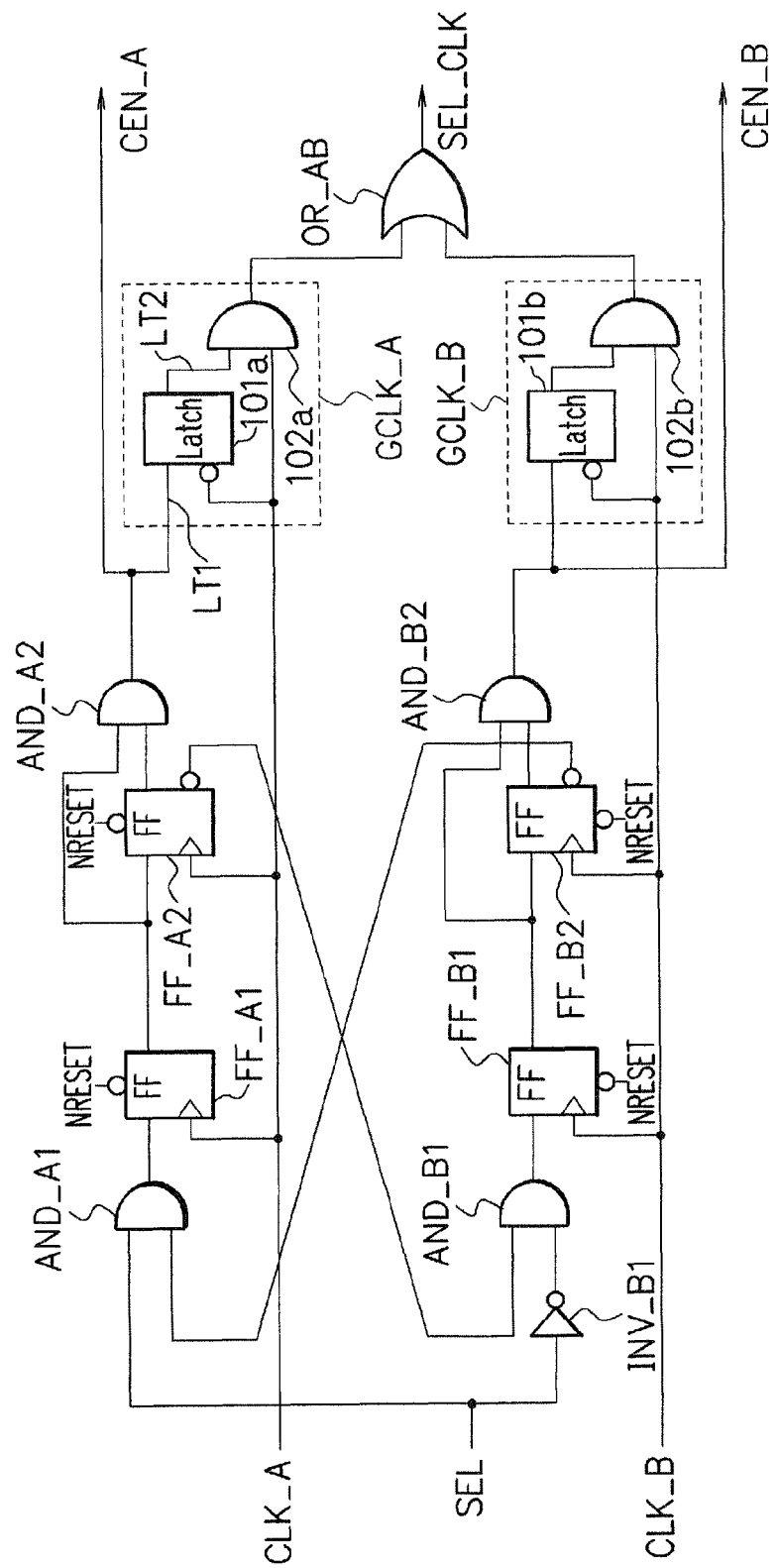
FIG. 1 is a circuit diagram depicting a configuration example of a clock signal selection circuit according to a first embodiment.
Figure 2:
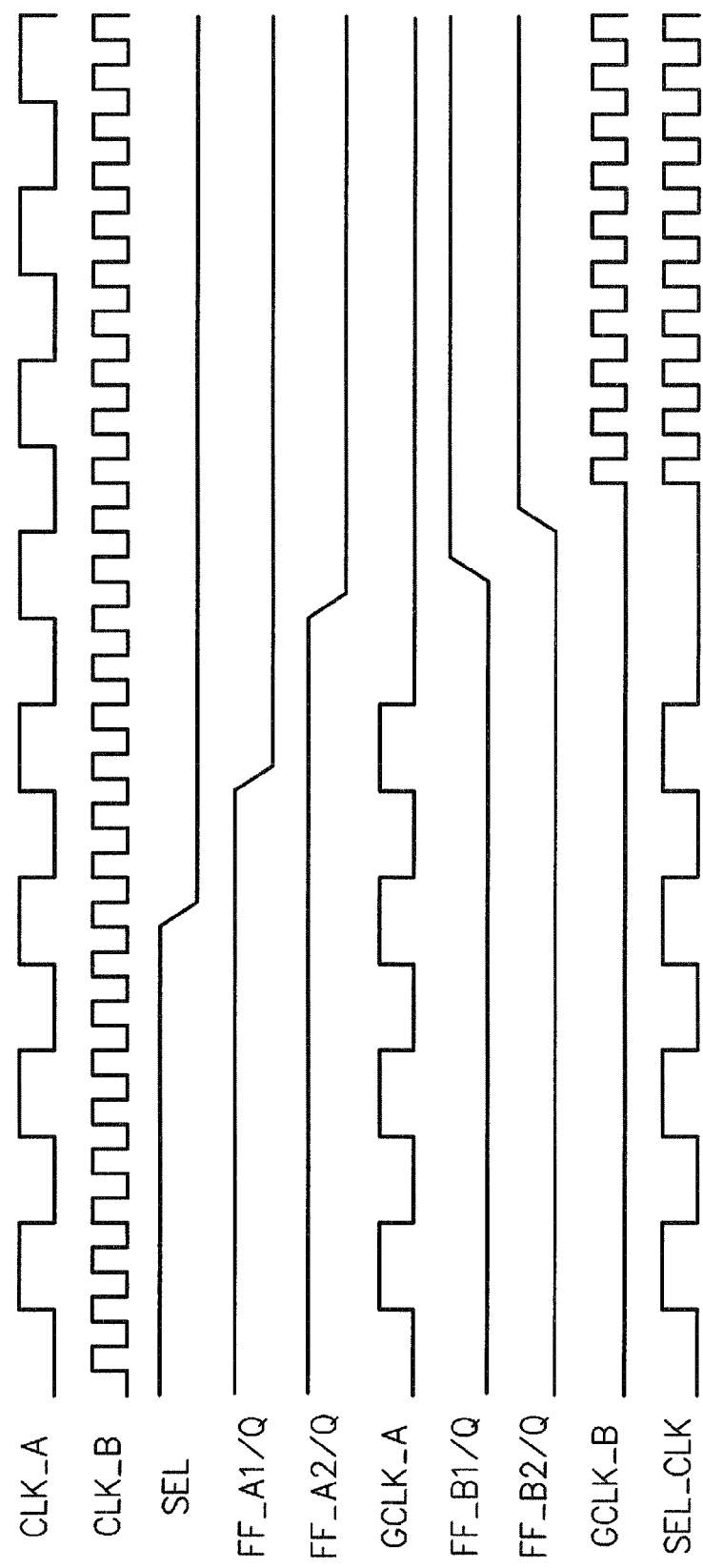
FIG. 2 is a timing chart depicting an operation of the clock signal selection circuit according to the first embodiment.
Figure 3:
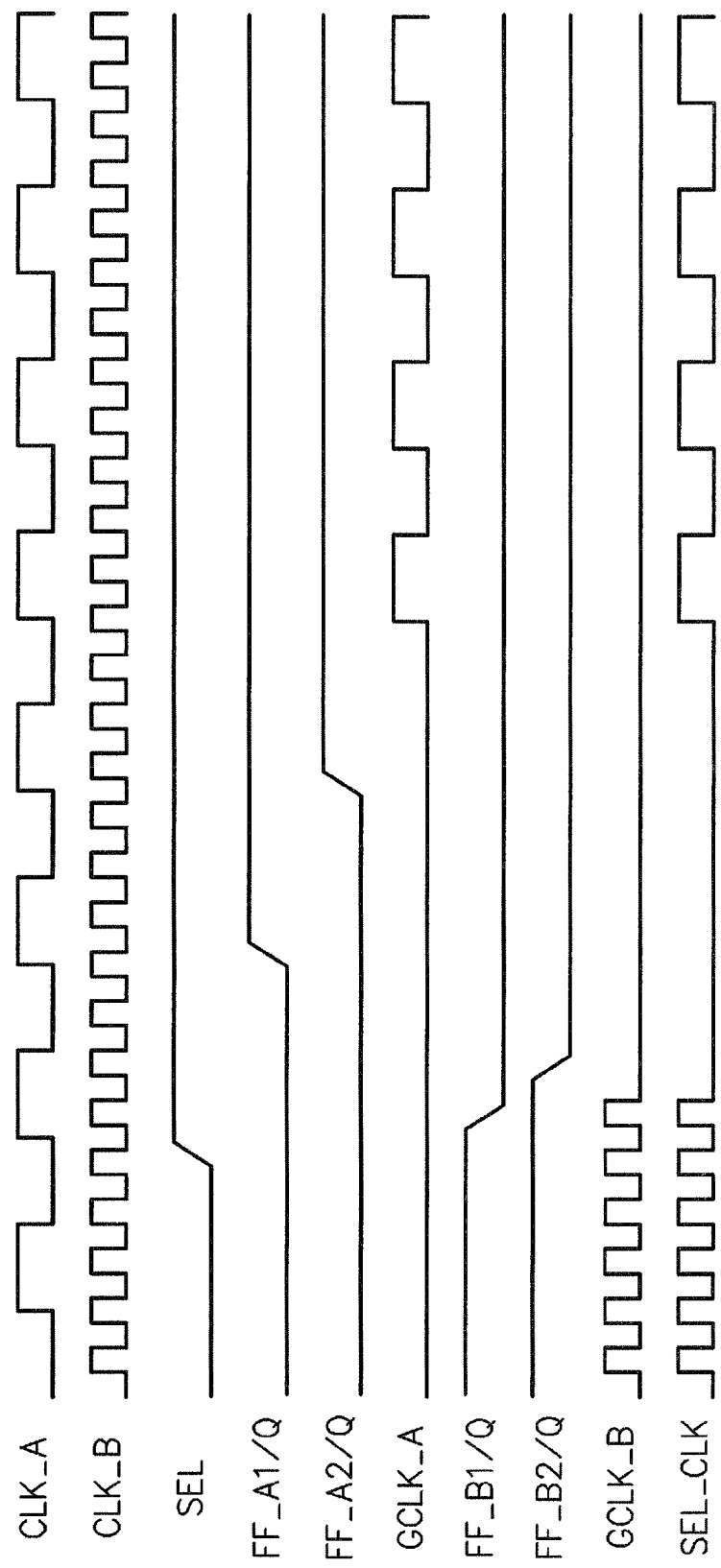
FIG. 3 is a timing chart depicting an operation of the clock signal selection circuit according to the first embodiment.

FIG. 1 is a circuit diagram depicting a configuration example of a clock signal selection circuit according to a first embodiment, and FIG. 2 and FIG. 3 are timing charts depicting an operation thereof. This clock signal selection circuit, in accordance with a clock selection signal SEL, selects either a first clock signal CLK_A or a second clock signal CLK_B to output a clock signal SEL_CLK.

FIG. 2 depicts an example where output is switched from the first clock signal CLK_A to the second clock signal CLK_B, and FIG. 3 depicts an example where output is switched from the second clock signal CLK_B to the first clock signal CLK_A. There are depicted, in the order from the top, the first clock signal CLK_A, the second clock signal CLK_B, the clock selection signal SEL, an output signal FF_A1/Q from a flip-flop FF_A1, an output signal FF_A2/Q from a flip-flop FF_A2, an output signal from a gated clock buffer GCLK_A, an output signal FF_B1/Q from a flip-flop FF_B1, an output signal FF_B2/Q from a flip-flop FF_B2, an output signal from a gated clock buffer GCLK_B, and the clock signal SEL_CLK in FIG. 2 and FIG. 3.

An AND circuit AND_A1 outputs a logical product signal of the clock selection signal SEL and a first control signal that the flip-flop FF_B2 outputs. An inverter INV_B1 outputs a logical inversion signal of the clock selection signal SEL. An AND circuit AND_B1 outputs a logical product signal of the output signal from the inverter INV_B1 and a second control signal that the flip-flop FF_A2 outputs.

The flip-flop FF_A1 inputs the logical product signal that the AND circuit AND_A1 outputs, and outputs an output signal in synchronization with the first clock signal CLK_A. The flip-flop FF_A2 inputs the output signal that the flip-flop FF_A1 outputs, and outputs a first output signal in synchronization with the first clock signal CLK_A to an AND circuit AND_A2 to output a logical inversion signal of the first output signal to the AND circuit AND_B1 as the second control signal. For example, the flip-flops FF_A1 and FF_A2 hold the input signal in synchronization with the rising of the first clock signal CLK_A to output it.

The flip-flops FF_A1 and FF_A2 are preset to hold a high level when a signal NRESET becomes a low level at the time of initialization. The clock selection signal SEL is an asynchronous signal with respect to the first clock signal CLK_A, and therefore the flip-flop FF_A1 has a possibility of outputting an indefinite value. Even when the flip-flop FF_A1 outputs the indefinite value, the flip-flop FF_A2 can determine an output value to prevent the indefinite value from propagating to a subsequent stage.

The AND circuit AND_A2 outputs a logical product signal of the input signal to the flip-flop FF_A2 and the first output signal. The output signal from the AND circuit AND_A2 is output as a first monitor signal CEN_A.

The first gated clock buffer GCLK_A inputs the input signal to the flip-flop FF_A2, and gate-controls the input signal by the first clock signal CLK_A to output a clock signal. Concretely, the first gated clock buffer GCLK_A is a latch-type gated clock buffer to have a latch circuit 101a and an AND circuit 102a. The latch circuit 101a inputs the logical product signal that the AND circuit AND_A2 outputs as an input signal LT1, and makes the input signal pass therethrough in accordance with the level of the first clock signal CLK_A to output it as an output signal LT2. The AND circuit 102a outputs a logical product signal of the output signal LT2 from the latch circuit 101a and the first clock signal CLK_A.

Figure 22:
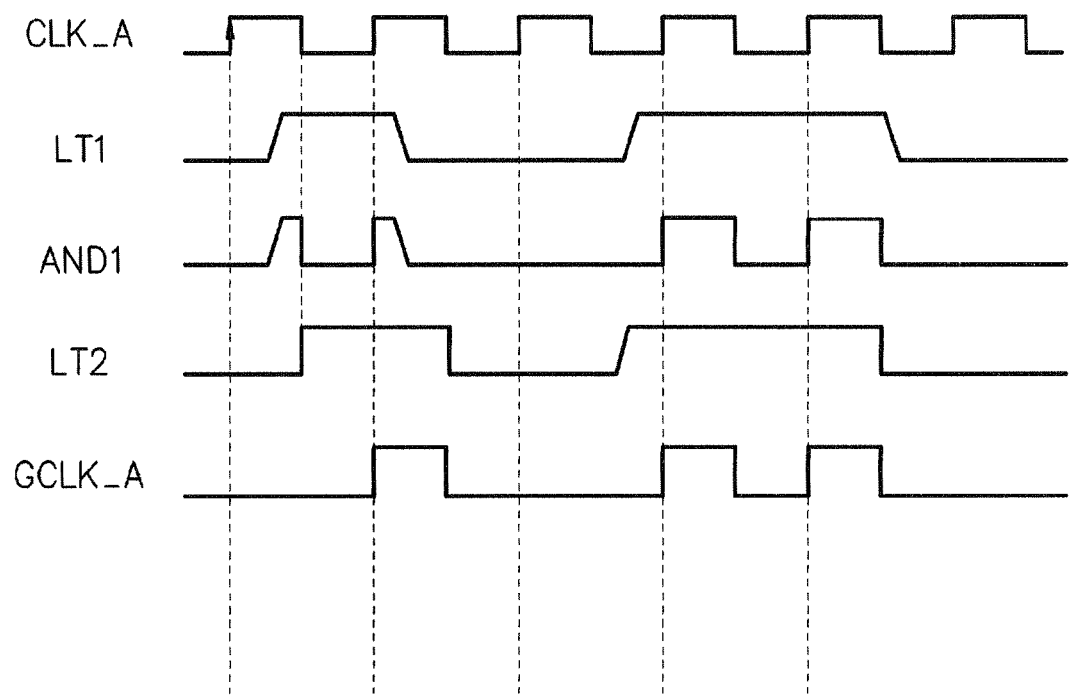
FIG. 22 is a timing chart depicting an operation of the clock signal selection circuit in FIG. 20.

As depicted in FIG. 22, the latch circuit 101a inputs the signal LT1, and outputs the input signal LT1 as the output signal LT2 as it is when the first clock signal CLK_A is a low level. When the first clock signal CLK_A is a high level, the latch circuit 101a holds the output signal LT2 in a previous state to output it. The AND circuit 102a outputs the logical product signal of the output signal LT2 from the latch circuit 101a and the first clock signal CLK_A.

Here, in the case when the latch circuit 101a in the gated clock buffer GCLK_A does not exist, the AND circuit 102a outputs a logical product signal AND1 of the signal LT1 and the clock signal CLK_A depicted in FIG. 22. This logical product signal AND1 has a faster timing of a pulse than that of the signal GCLK_A, and therefore a condition of set up time becomes severe. Providing the latch circuit 101a delays the timing of the pulse of the signal GCLK_A, and therefore the condition of set up time can be loosened.

The flip-flop FF_B1 inputs the logical product signal that the AND circuit AND_B1 outputs to output an output signal in synchronization with the second clock signal CLK_B. The flip-flop FF_B2 inputs the output signal that the flip-flop FF_B1 outputs, and outputs a second output signal in synchronization with the second clock signal CLK_B to the AND circuit AND_B2 to output a logical inversion signal of the second output signal to the AND circuit AND_A1 as the first control signal. For example, the flip-flops FF_B1 and FF_B2 hold the input signal in synchronization with the rising of the second clock signal CLK_B to output it.

The flip-flops FF_B1 and FF_B2 are reset to hold a low level when the signal NRESET becomes a low level at the time of initialization. The clock selection signal SEL is an asynchronous signal with respect to the second clock signal CLK_B, and therefore the flip-flop FF_B1 has a possibility of outputting an indefinite value. Even when the flip-flop FF_B1 outputs the indefinite value, the flip-flop FF_B2 can determine an output value to prevent the indefinite value from propagating to a subsequent stage.

The AND circuit AND_B2 outputs a logical product signal of the input signal to the flip-flop FF_B2 and the second output signal. The output signal from the AND circuit AND_B2 is output as a monitor signal CEN_B.

The second gated clock buffer GCLK_B, similar to the first gated clock buffer GCLK_A, inputs the output signal from the AND circuit AND_B2, and gate-controls the input signal by the second clock signal CLK_B to output a clock signal. Concretely, the second gated clock buffer GCLK_B is a latch-type gated clock buffer to have a latch circuit 101b and an AND circuit 102b. The latch circuit 101b inputs the logical product signal that the AND circuit AND_B2 outputs, and makes the input signal pass therethrough in accordance with the level of the second clock signal CLK_B to output it. The AND circuit 102b outputs a logical product signal of the output signal from the latch circuit 101b and the second clock signal CLK_B.

An OR circuit OR_AB outputs a logical sum signal of the clock signals that the AND circuits 102a and 102b in the gated clock buffers GCLK_A and GCLK_B output.

When the clock selection signal SEL is made to be a high level, the first clock signal CLK_A can be selected to output the clock signal SEL_CLK. On the contrary, when the clock selection signal SEL is made to be a low level, the second clock signal CLK_B can be selected to output the clock signal SEL_CLK.

As described above, it becomes possible to select either the clock signal CLK_A or the clock signal CLK_B in accordance with the clock selection signal SEL to output the clock signal SEL_CLK after the selection, and output the monitor signals CEN_A and CEN_B indicating that which clock signal is being selected currently.

Generation of the input signal (an enable signal) to the gated clock buffer GCLK_A for selecting the clock signal CLK_A is performed in circuit elements AND_A1, FF_A1, FF_A2, and AND_A2 that receive the clock selection signal SEL, and generation of the input signal (the enable signal) to the gated clock buffer GCLK_B for selecting the clock signal CLK_B is performed in circuit elements AND_B1, FF_B1, FF_B2, and AND_B2 that receive the clock selection signal SEL inverted in the inverter INV_B1.

The input signals to the respective gated clock buffers GCLK_A and GCLK_B (the output signals from the AND circuits AND_A2 and AND_B2) are in a relationship with the logical inversion signal each other, and a value of the clock selection signal SEL makes either the clock signal CLK_A or the clock signal CLK_B an enable state (a selected state), and a signal made after an OR operation is performed for the output signals from these two gated clock buffers GCLK_A and GCLK_B in the OR circuit OR_AB becomes the selected clock signal SEL_CLK.

In the case of switching the clock signal CLK_A or the clock signal CLK_B, the input signal to either the flip-flop FF_A2 or the flip-flop FF_B2 stops either the clock signal CLK_A or the clock signal CLK_B, which is not yet to be switched, via either the AND circuit AND_A2 or the AND circuit AND_B2. Then, an inverted output signal from either the flip-flop FF_A2 or the flip-flop FF_B2 is input to either the AND circuit AND_A1 or the AND circuit AND_B1 where a clock enable signal at a switching destination is generated, and it is delayed in either the flip-flops FF_A1, FF_A2, and a flip-flop FF_A3 or the flip-flops FF_B1, FF_B2, and a flip-flop FF_B3, and then, the clock enable signal after being switched is validated.

With such a circuit configuration, at the time of switching the clock signal, it becomes possible to secure that the clock signals output from the gated clock buffers GCLK_A and GCLK_B do not overlap, and prevent the inappropriate clock such as a glitch from being output at the time of switching the clock.

Note that the gated clock buffers GCLK_A and GCLK_B can secure a set-up timing of the clock enable signal for one cycle to provide it as a single cell library. However, in the case when such a cell does not exist as well, configuring the gated clock buffer makes it possible to realize the circuit that has the same function.

Further, the clock selection signal SEL is an asynchronous signal with respect to the clock signals CLK_A and CLK_B. The flip-flops FF_A1, FF_A2, FF_B1, and FF_B2 are flip-flops for a metastable prevention that receive the clock selection signal SEL in synchronization with any one of clock edges. That is, as described above, propagation of the indefinite value to a subsequent stage can be prevented. In the case when edges of the clock signals for generating the clock signals CLK_A and CLK_B, and the clock selection signal SEL are in a uniform manner, for example, in the case when the clock signals CLK_A and CLK_B are not in a relationship with asynchronous clocks, but in a relationship such that simply the clock signal CLK_A is divided to generate the clock signal CLK_B, and in the case when the clock selection signal SEL is also generated by the clock signal in phase with either the clock signal CLK_A or the clock signal CLK_B, the flip-flops FF_A1 and FF_B1 for the metastable prevention can be omitted.

It is set that the flip-flops FF_A1 and FF_A2 are the flip-flops to be preset and the flip-flops FF_B1 and FF_B2 are the flip-flops to be reset, but the above is to select the clock signal CLK_A in an initialization state at the time of reset. The relationship of the flip-flops FF_A1 and FF_A2 to preset and the flip-flops FF_B1 and FF_B2 to reset may be inverted. In this case, the clock signal to be selected in a default state is simply inverted. Note that as for these flip-flops, the flip-flops not to be reset/preset may be used, but in a logic simulation at a design stage, the indefinite values of these flip-flops at the beginning of the simulation are propagated to the clock signal SEL_CLK. Therefore, if there are not particular circumstances, it is desirable that the flip-flops are configured to be reset/preset.

Second Embodiment

Figure 4:
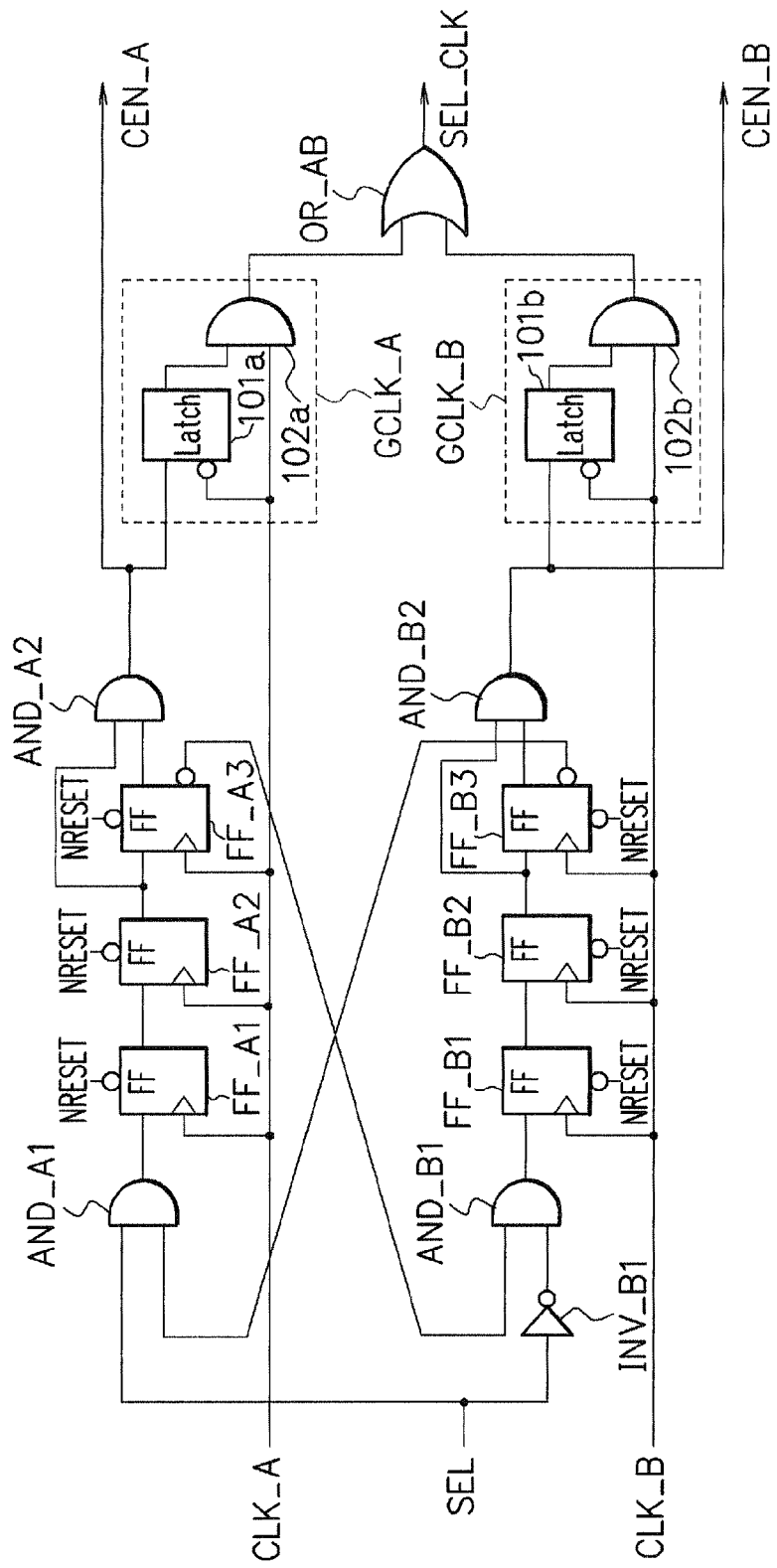
FIG. 4 is a circuit diagram depicting a configuration example of a clock signal selection circuit according to a second embodiment.
Figure 5:
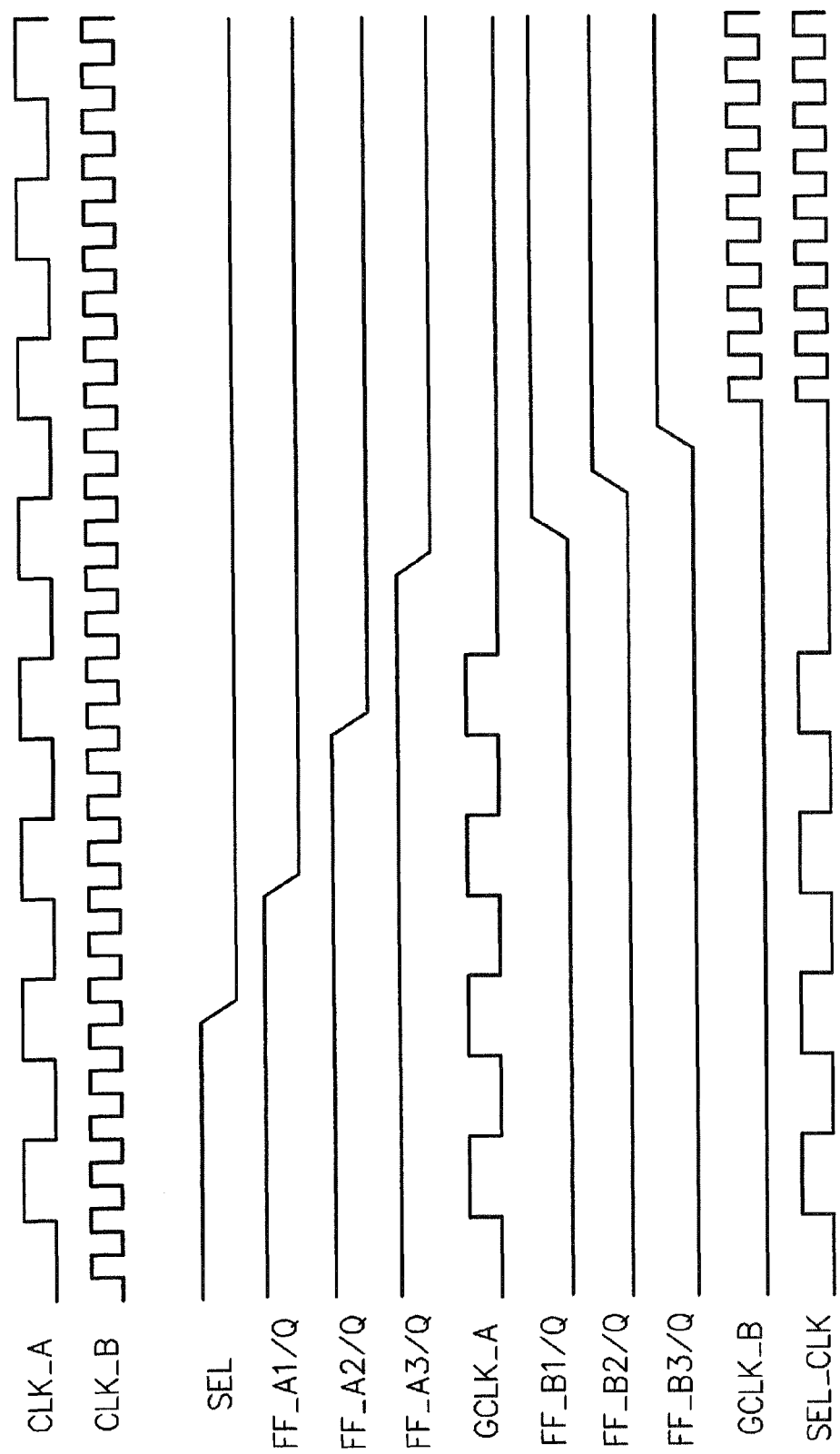
FIG. 5 is a timing chart depicting an operation of the clock signal selection circuit according to the second embodiment.
Figure 6:
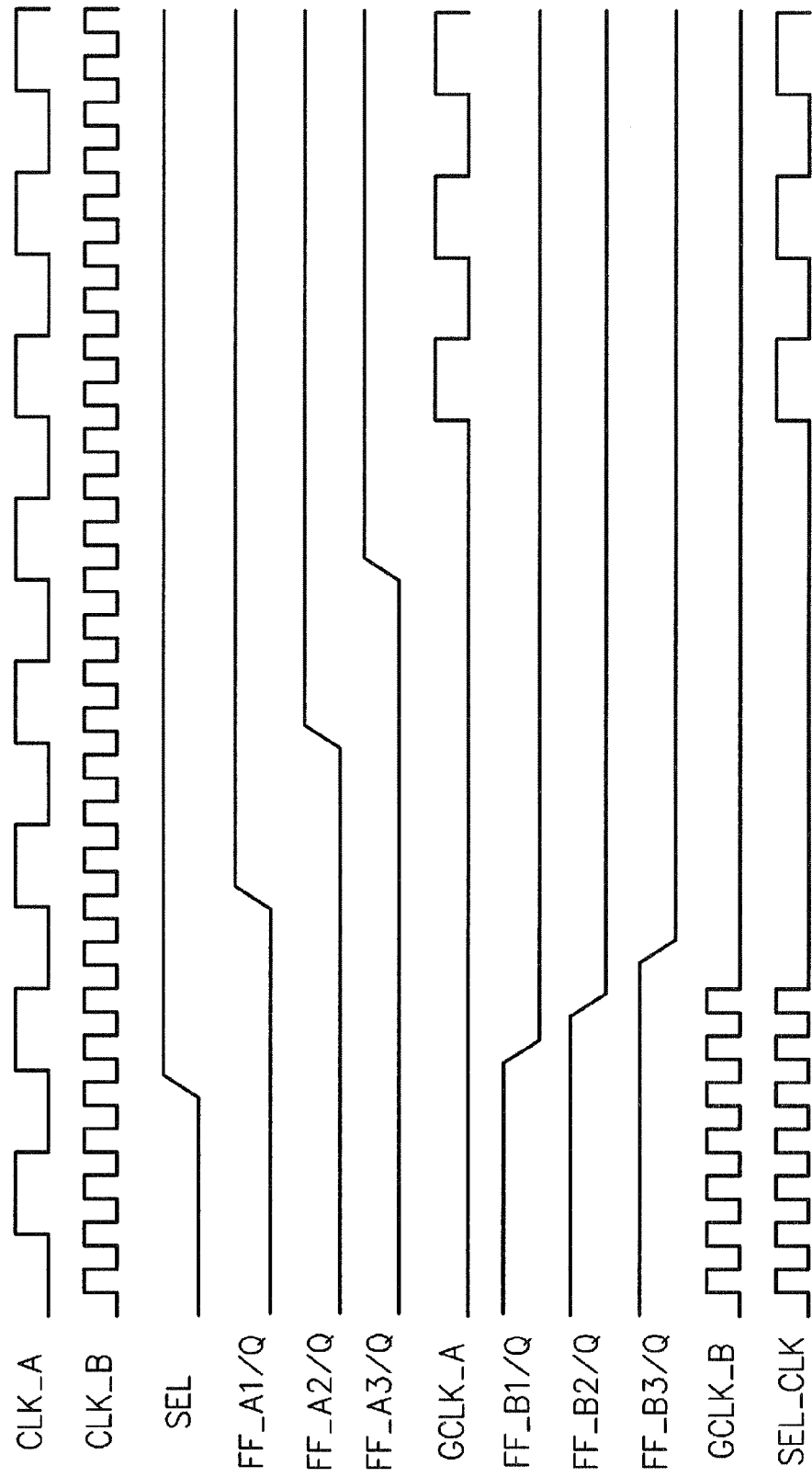
FIG. 6 is a timing chart depicting an operation of the clock signal selection circuit according to the second embodiment.

FIG. 4 is a circuit diagram depicting a configuration example of a clock signal selection circuit according to a second embodiment, and FIG. 5 and FIG. 6 are timing charts of an operation thereof. Hereinafter, points on which this embodiment is different from the first embodiment will be explained. The first embodiment explains the case where the flip-flops FF_A1 and FF_A2 of two stages in synchronization with the first clock signal CLK_A and the flip-flops FF_B1 and FF_B2 of two stages in synchronization with the second clock signal CLK_B are provided. This embodiment will explain the case where the flip-flops FF_A1 and FF_A2 and a flip-flop FF_A3 of three stages in synchronization with the first clock signal CLK_A and the flip-flops FF_B1 and FF_B2 and a flip-flop FF_B3 of three stages in synchronization with the second clock signal CLK_B are provided. The effect of this embodiment is the same as that of the first embodiment, but a clock switching timing is delayed for one cycle compared with the first embodiment.

FIG. 5 depicts an example of switching output from the first clock signal CLK_A to the second clock signal CLK_B, and FIG. 6 depicts an example of switching output from the second clock signal CLK_B to the first clock signal CLK_A. There are depicted, in the order from the top, the first clock signal CLK_A, the second clock signal CLK_B, the clock selection signal SEL, the output signal FF_A1/Q from the flip-flop FF_A1, the output signal FF_A2/Q from the flip-flop FF_A2, an output signal FF_A3/Q from the flip-flop FF_A3, the output signal from the gated clock buffer GCLK_A, the output signal FF_B1/Q from the flip-flop FF_B1, the output signal FF_B2/Q from the flip-flop FF_B2, an output signal FF_B3/Q from the flip-flop FF_B3, the output signal from the gated clock buffer GCLK_B, and the clock signal SEL_CLK in FIG. 5 and FIG. 6.

The flip-flop FF_A1 inputs the logical product signal that the AND circuit AND_A1 outputs, and outputs an output signal in synchronization with the first clock signal CLK_A. The flip-flop FF_A2 inputs the output signal that the flip-flop FF_A1 outputs, and outputs an output signal in synchronization with the first clock signal CLK_A. The flip-flop FF_A3 inputs the output signal that the flip-flop FF_A2 outputs, and outputs a first output signal in synchronization with the first clock signal CLK_A to the AND circuit AND_A2 to output a logical inversion signal of the first output signal to the AND circuit AND_B1 as the above-described second control signal. For example, the flip-flops FF_A1, FF_A2, and FF_A3 hold the input signal in synchronization with the rising of the first clock signal CLK_A to output it. Further, the flip-flops FF_A1, FF_A2, and FF_A3 are preset to hold a high level when the signal NRESET becomes a low level at the time of initialization. The AND circuit AND_A2 outputs a logical product signal of the input signal to the flip-flop FF_A3 and the first output signal to the gated clock buffer GCLK_A. The output signal from the AND circuit AND_A2 is output as the monitor signal CEN_A.

The flip-flop FF_B1 inputs the logical product signal that the AND circuit AND_B1 outputs, and outputs an output signal in synchronization with the second clock signal CLK_B. The flip-flop FF_B2 inputs the output signal that the flip-flop FF_B1 outputs, and outputs an output signal in synchronization with the second clock signal CLK_B. The flip-flop FF_B3 inputs the output signal that the flip-flop FF_B2 outputs, and outputs a second output signal in synchronization with the second clock signal CLK_B to the AND circuit AND_B2 to output a logical inversion signal of the second output signal to the AND circuit AND_A1 as the above-described first control signal. For example, the flip-flops FF_B1, FF_B2, and FF_B3 hold the input signal in synchronization with the rising of the second clock signal CLK_B to output it. Further, the flip-flops FF_B1, FF_B2, and FF_B3 are reset to hold a low level when the signal NRESET becomes a low level at the time of initialization. The AND circuit AND_B2 outputs a logical product signal of the input signal to the flip-flop FF_B3 and the second output signal to the gated clock buffer GCLK_B. The output signal from the AND circuit AND_B2 is output as the monitor signal CEN_B.

Third Embodiment

FIG. 7 is a circuit diagram depicting a configuration example of a clock signal selection circuit according to a third embodiment. This embodiment has the same operational waveforms as those of the second embodiment depicted in FIG. 5 and FIG. 6, and has the equivalent effect. This embodiment is the circuit in which the AND circuits AND_A2 and AND_B2 are omitted with respect to the second embodiment.

Hereinafter, points on which this embodiment is different from the second embodiment will be explained. The gated clock buffer GCLK_A inputs the input signal to the flip-flop FF_A3, and the gated clock buffer GCLK_B inputs the input signal to the flip-flop FF_B3. Concretely, the latch circuit 101a in the gated clock buffer GCLK_A inputs the input signal to the flip-flop FF_A3, and the latch circuit 101b in the gated clock buffer GCLK_B inputs the input signal to the flip-flop FF_B3. The input signal to the flip-flop FF_A3 is output as the monitor signal CEN_A, and the input signal to the flip-flop FF_B3 is output as the monitor signal CEN_B.

In this clock signal selection circuit, asynchronous transfer (the metastable prevention) is performed in the flip-flops FF_A1 and FF_A2 and the flip-flops FF_B1 and FF_B2, and thereby, the same operation as that of the second embodiment can be performed although these AND circuits AND_A2 and AND_B2 do not exist.

Fourth Embodiment

Figure 9:
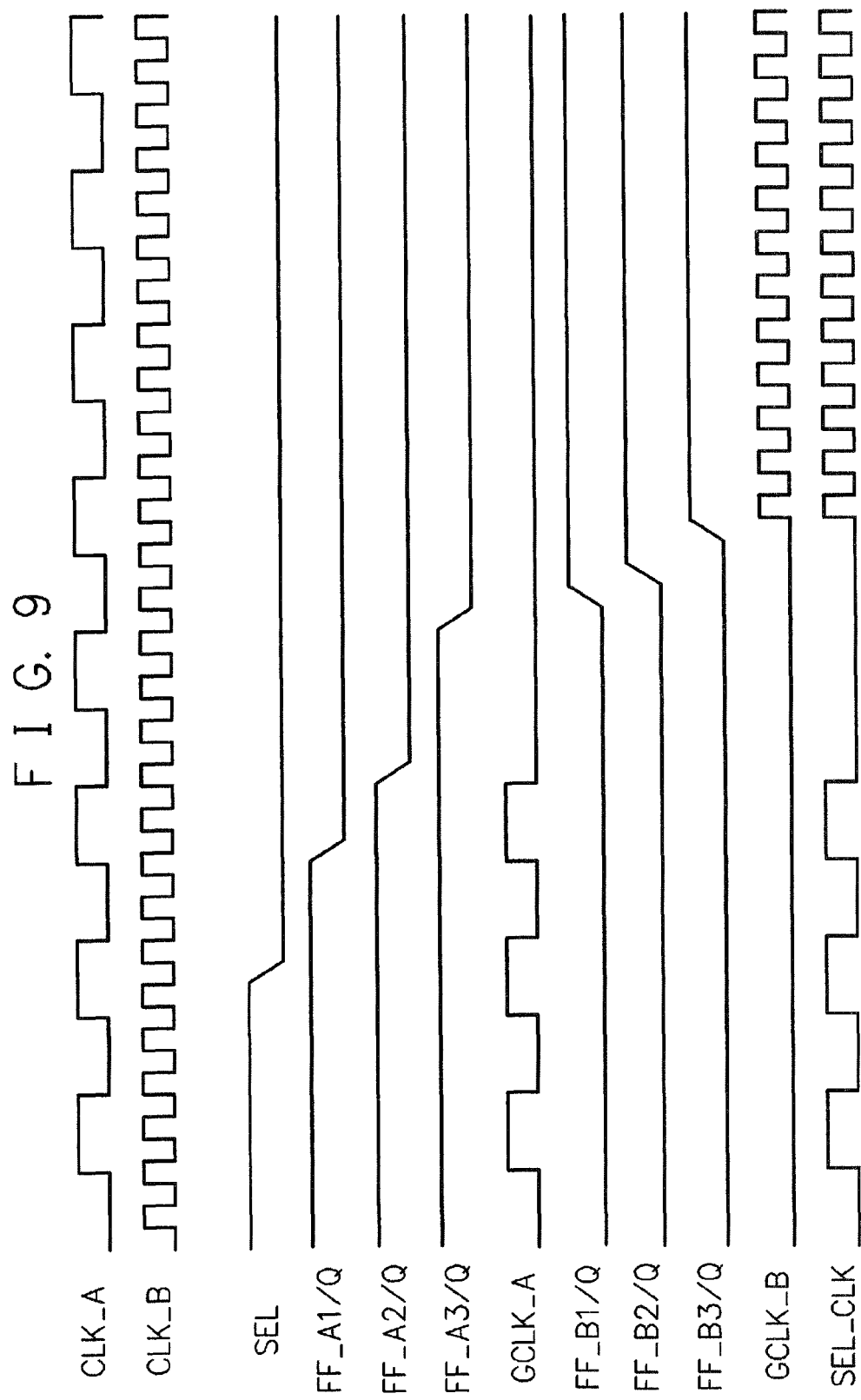
FIG. 9 is a timing chart depicting an operation of the clock signal selection circuit according to the fourth embodiment.
Figure 10:
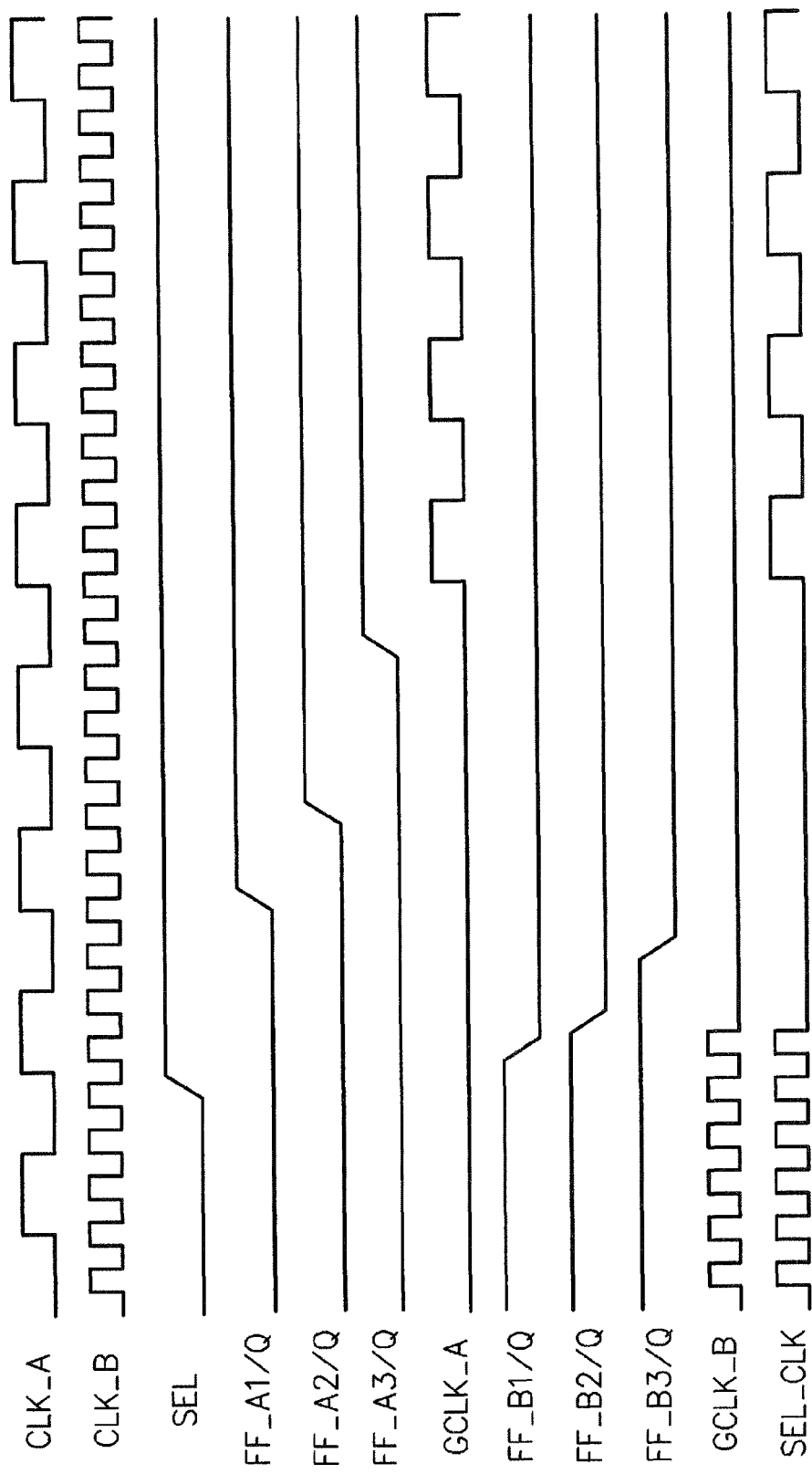
FIG. 10 is a timing chart depicting an operation of the clock signal selection circuit according to the fourth embodiment.

FIG. 8 is a circuit diagram depicting a configuration example of a clock signal selection circuit according to a fourth embodiment, and FIG. 9 and FIG. 10 are timing charts depicting an operation thereof. This embodiment has different configurations of the gated clock buffers GCLK_A and GCLK_B from the third embodiment.

Hereinafter, points on which this embodiment is different from the third embodiment will be explained. The gated clock buffers GCLK_A and GCLK_B in the third embodiment are the latch-type gated clock buffers. On the contrary, the gated clock buffers GCLK_A and GCLK_B in this embodiment are AND-type gated clock buffers. The gated clock buffer GCLK_A is configured only by the AND circuit 102a, and the gated clock buffer GCLK_B is configured only by the AND circuit 102b. The AND circuit 102a outputs a logical product signal of the input signal to the flip-flop FF_A3 and the first clock signal CLK_A to the OR circuit OR_AB. The AND circuit 102b outputs a logical product signal of the input signal to the flip-flop FF_B3 and the second clock signal CLK_B to the OR circuit OR_AB.

When performing clock gating in the AND circuits 102a and 102b, the inverted clock signal is input to clock terminals of the flip-flops FF_A2 and FF_A3 and the flip-flops FF_B2 and FF_B3 not to distort the waveform of the clock signal. That is, the flip-flop FF_A1 holds the input signal in synchronization with the rising of the first clock signal CLK_A to output it. The flip-flops FF_A2 and FF_A3 hold the input signal in synchronization with the falling of the first clock signal CLK_A to output it. Further, the flip-flop FF_B1 holds the input signal in synchronization with the rising of the second clock signal CLK_B to output it. The flip-flops FF_B2 and FF_B3 hold the input signal in synchronization with the falling of the second clock signal CLK_B to output it.

FIG. 9 depicts an example of switching output from the first clock signal CLK_A to the second clock signal CLK_B, and FIG. 10 depicts an example of switching output from the second clock signal CLK_B to the first clock signal CLK_A. There are depicted, in the order from the top, the first clock signal CLK_A, the second clock signal CLK_B, the clock selection signal SEL, the output signal FF_A1/Q from the flip-flop FF_A1, the output signal FF_A2/Q from the flip-flop FF_A2, the output signal FF_A3/Q from the flip-flop FF_A3, the output signal from the gated clock buffer GCLK_A, the output signal FF_B1/Q from the flip-flop FF_B1, the output signal FF_B2/Q from the flip-flop FF_B2, the output signal FF_B3/Q from the flip-flop FF_B3, the output signal from the gated clock buffer GCLK_B, and the clock signal SEL_CLK in FIG. 9 and FIG. 10.

This embodiment can obtain the same effect as that of the third embodiment. Further, this embodiment can apply not only to the third embodiment but also to the first and second embodiments. That is, similar to this embodiment, the gated clock buffers GCLK_A and GCLK_B in the first and second embodiments can be configured as the AND-type gated clock buffer.

Fifth Embodiment

Figure 11:
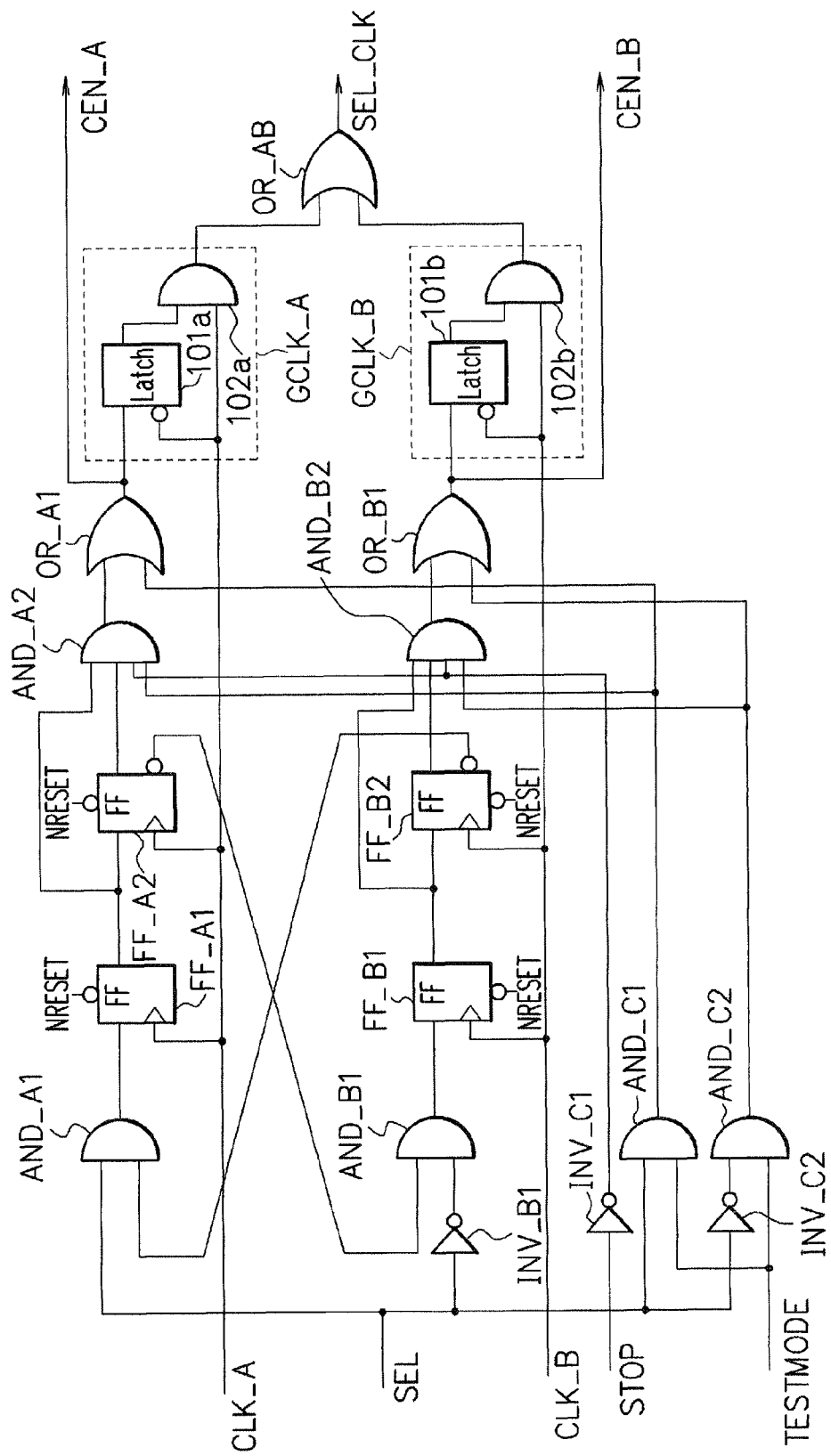
FIG. 11 is a circuit diagram depicting a configuration example of a clock signal selection circuit according to a fifth embodiment.

FIG. 11 is a circuit diagram depicting a configuration example of a clock signal selection circuit according to a fifth embodiment. This embodiment, with respect to the first embodiment, has a test mode signal TESTMODE for performing a scan (SCAN) test and the like added, and further has a clock stop signal STOP for controlling a clock stop added. The timing charts at the time of clock switching are the same as those depicted in FIG. 2 and FIG. 3.

Hereinafter, points on which this embodiment is different from the first embodiment will be explained. An inverter INV_C1 outputs a logical inversion signal of the clock stop signal STOP. An inverter INV_C2 outputs a logical inversion signal of the clock selection signal SEL. An AND circuit AND_C1 outputs a logical product signal of the clock selection signal SEL and the test mode signal TESTMODE. An AND circuit AND_C2 outputs a logical product signal of the output signal from the inverter INV_C2 and the test mode signal TESTMODE.

The AND circuit AND_A2 outputs a logical product signal of an input signal to the flip-flop FF_A2, an output signal from the flip-flop FF_A2, the output signal from the inverter INV_C1, and the output signal from the AND circuit AND_C1. The AND circuit AND_B2 outputs a logical product signal of an input signal to the flip-flop FF_B2, an output signal from the flip-flop FF_B2, the output signal from the inverter INV_C1, and the output signal from the AND circuit AND_C2.

An OR circuit OR_A1 outputs a logical sum signal of the output signal from the AND circuit AND_A2 and the output signal from the AND circuit AND_C1 to the latch circuit 101a in the gated clock buffer GCLK_A. The output signal from the OR circuit OR_A1 is output as the monitor signal CEN_A.

An OR circuit OR_B1 outputs a logical sum signal of the output signal from the AND circuit AND_B2 and the output signal from the AND circuit AND_C2 to the latch circuit 101b in the gated clock buffer GCLK_B. The output signal from the OR circuit OR_B1 is output as the monitor signal CEN_B.

At the time of stand-by, or the like, the clock stop signal STOP is made to be a high level, and thereby the clock stop signal STOP masks each of the enable signals of the clock signals CLK_A and CLK_B in the AND circuits AND_A2 and AND_B2 by the signal inverted in the inverter INV_C1 to stop the clock signal SEL_CLK. That is, a clock stop setting circuit has the inverter INV_C1, and the AND circuits AND_A2 and AND_B2, and sets the input signals to the gated clock buffers GCLK_A and GCLK_B to be a low level regardless of the clock selection signal SEL when the clock stop signal STOP is input. Accordingly, the clock signal SEL_CLK holds a low level, and the clock is stopped.

At the time of SCAN test, clock control registers 1411 to 1414 (FIG. 14) and the flip-flops FF_A1, FF_A2, FF_B1, and FF_B2 can be scan tested as well. In the case, the flip-flops FF_A1, FF_A2, FF_B1, and FF_B2, regardless of the clock selection signal SEL, operate in accordance with test data input from scan-in (SCAN-IN) terminals, and therefore there arises a problem that the clock signal SEL_CLK is not secured. The clock signal SEL_CLK needs to be kept output regardless of the value of the control signal such as the clock stop signal STOP and the flip-flops FF_A1, FF_A2, FF_B1, and FF_B2. Thus, when the test mode signal TESTMODE becomes a high level, in accordance with the clock selection signal SEL, one of the AND circuits AND_C1 and AND_C2 outputs a high level, and the other outputs a low level. The other outputs a low level, and thereby, either the AND circuit AND_A2 or the AND circuit AND_B2 outputs a low level. Accordingly, one of the OR circuits OR_A1 and OR_B1 outputs a high level, and the other outputs a low level. Consequently, regardless of the value of the clock stop signal STOP or the like, it becomes possible to keep the clock signal SEL_CLK output. Note that this embodiment is configured that the clock selected by the clock selection signal SEL is output when the test mode signal TESTMODE becomes a high level, but it may be configured such that the AND circuits AND_C1 and AND_C2 and so on are omitted, and either clock signal is only supplied when the test mode signal TESTMODE becomes a high level.

As described above, a test mode setting circuit has the inverter INV_C2, the AND circuits AND_C1, AND_C2, AND_A2, and AND_B2, and the OR circuits OR_A1 and OR_B1, and sets the input signals to the gated clock buffers GCLK_A and GCLK_B regardless of the operations of the flip-flops FF_A1, FF_A2, FF_B1, and FF_B2 when the test mode signal TESTMODE is input.

Note that this embodiment can apply not only to the first embodiment but also to the second to fourth embodiments.

Sixth Embodiment

Figure 12:
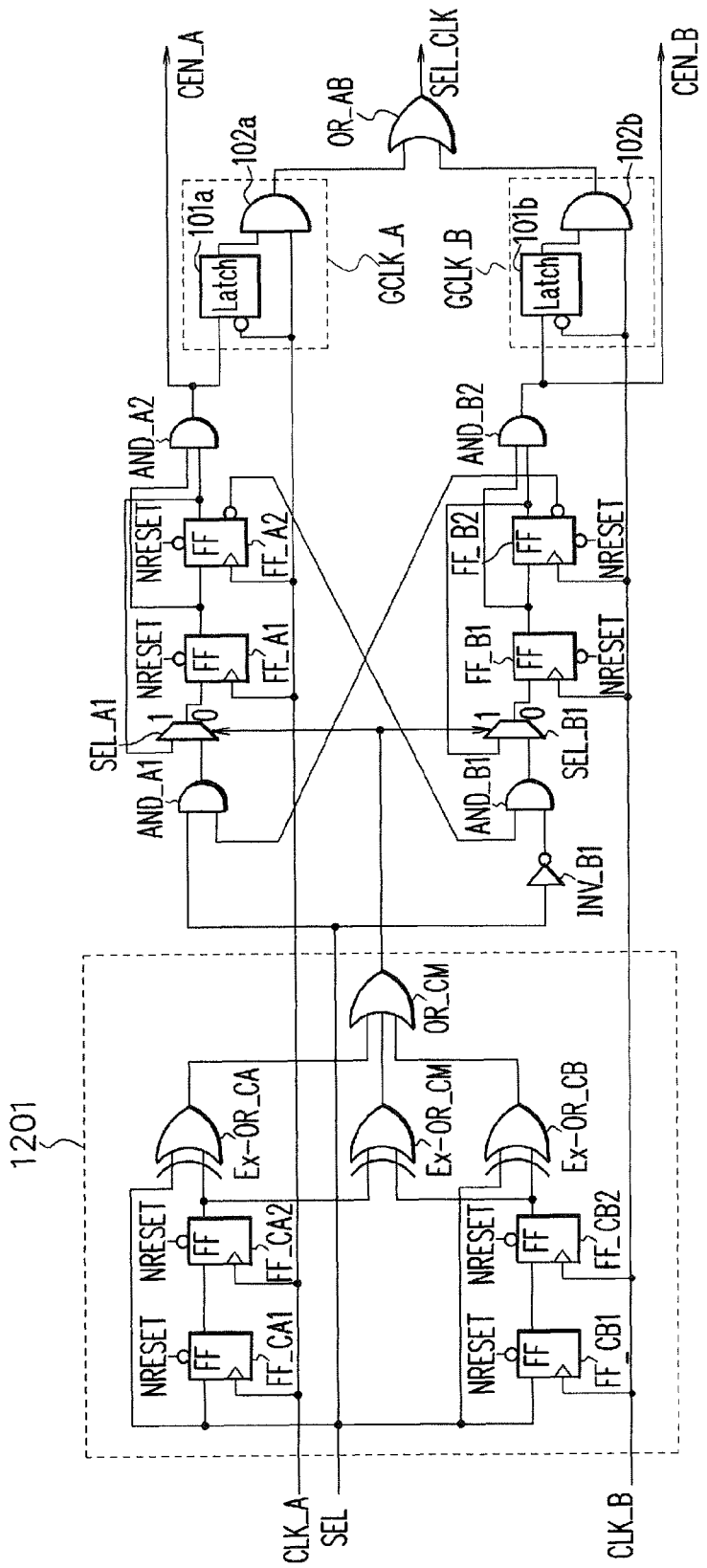
FIG. 12 is a circuit diagram depicting a configuration example of a clock signal selection circuit according to a sixth embodiment.
Figure 13:
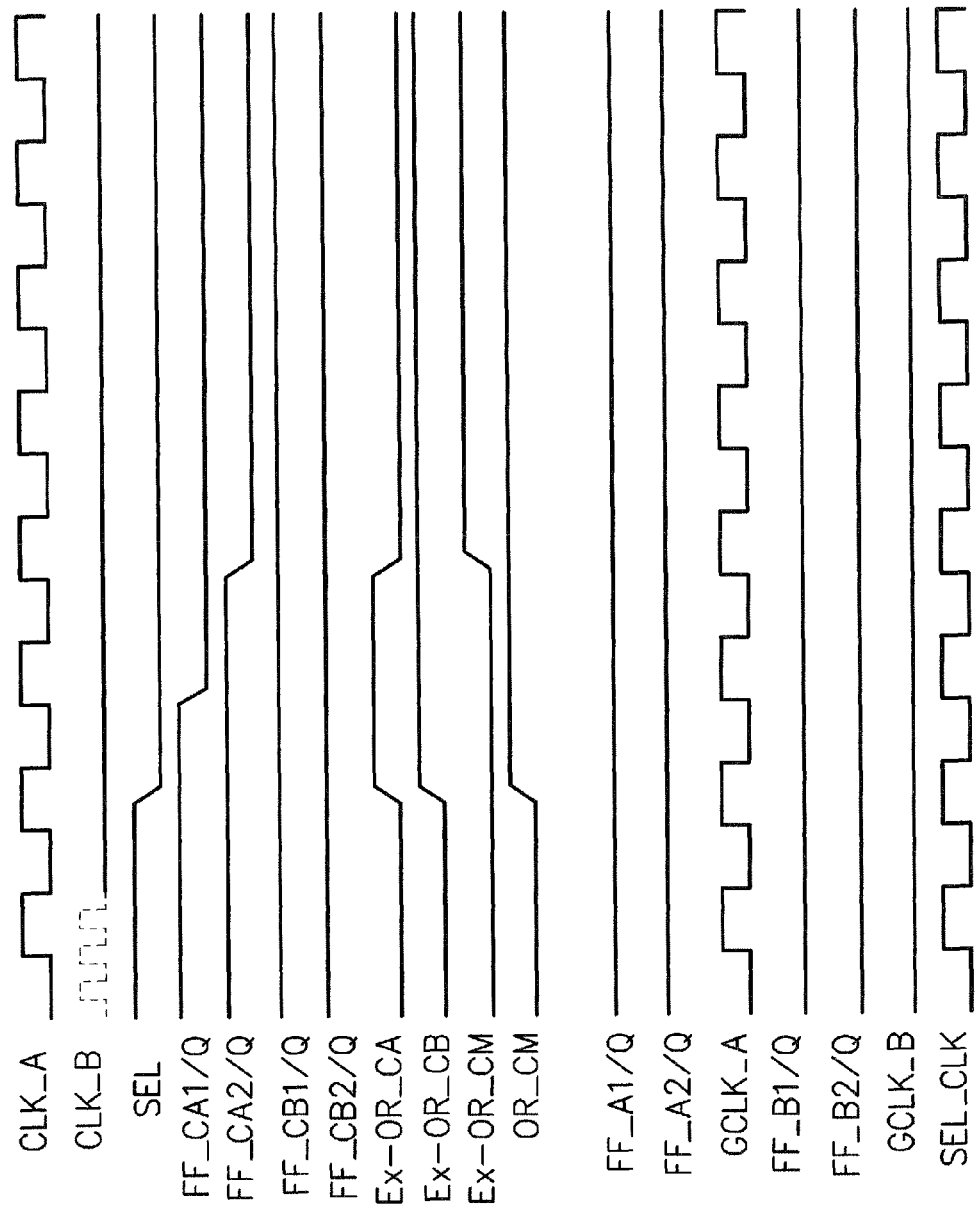
FIG. 13 is a timing chart depicting an operation of the clock signal selection circuit according to the sixth embodiment.

FIG. 12 is a circuit diagram depicting a configuration example of a clock signal selection circuit according to a sixth embodiment. FIG. 13 is a timing chart depicting an operation thereof. This embodiment, with respect to the first embodiment, has a switching prohibition circuit 1201 and selectors SEL_A1 and SEL_B1 added. Hereinafter, points on which this embodiment is different from the first embodiment will be explained.

There are depicted, in the order from the top, the first clock signal CLK_A, the second clock signal CLK_B, the clock selection signal SEL, an output signal FF_CA1/Q from a flip-flop FF_CA1, an output signal FF_CA2/Q from a flip-flop FF_CA2, an output signal FF_CB1/Q from a flip-flop FF_CB1, an output signal FF_CB2/Q from a flip-flop FF_CB2, an output signal from an exclusive OR circuit Ex-OR_CA, an output signal from an exclusive OR circuit Ex-OR_CB, an output signal from an exclusive OR circuit Ex-OR_CM, an output signal from an OR circuit OR_CM, the output signal FF_A1/Q from the flip-flop FF_A1, the output signal FF_A2/Q from the flip-flop FF_A2, the output signal from the gated clock buffer GCLK_A, the output signal FF_B1/Q from the flip-flop FF_B1, the output signal FF_B2/Q from the flip-flop FF_B2, the output signal from the gated clock buffer GCLK_B, and the clock signal SEL_CLK in FIG. 13.

The switching prohibition circuit 1201 prohibits output from switching from the second clock signal CLK_B to the first clock signal CLK_A when the first clock signal CLK_A is stopped, and the switching prohibition circuit 1201 prohibits output from switching from the first clock signal CLK_A to the second clock signal CLK_B when the second clock signal CLK_B is stopped. FIG. 13 depicts the case where the second clock signal CLK_B is stopped in the example.

The configuration of the switching prohibition circuit 1201 will be explained. The flip-flop FF_CA1 inputs the clock selection signal SEL to output it in synchronization with the rising of the first clock signal CLK_A. The flip-flop FF_CA2 inputs the output signal from the flip-flop FF_CA1 to output it in synchronization with the rising of the first clock signal CLK_A. The flip-flops FF_CA1 and FF_CA2 are preset to hold a high level when the signal NRESET becomes a low level at the time of initialization.

The flip-flop FF_CB1 inputs the clock selection signal SEL to output it in synchronization with the rising of the second clock signal CLK_B. The flip-flop FF_CB2 inputs the output signal from the flip-flop FF_CB1 to output it in synchronization with the rising of the second clock signal CLK_B. The flip-flops FF_CB1 and FF_CB2 are preset to hold a high level when the signal NRESET becomes a low level at the time of initialization.

The exclusive OR circuit Ex-OR_CA outputs an exclusive logical sum signal of the output signal from the flip-flop FF_CA2 and the clock selection signal SEL. The exclusive OR circuit Ex-OR_CB outputs an exclusive logical sum signal of the output signal from the flip-flop FF_CB2 and the clock selection signal SEL. The exclusive OR circuit Ex-OR_CM outputs an exclusive logical sum signal of the output signals from the flip-flops FF_CA2 and FF_CB2. The OR circuit OR_CM outputs a logical sum signal of the output signals from the exclusive OR circuits Ex-OR_CA, Ex-OR_CB, and Ex-OR_CM.

The selector SEL_A1 selects an output signal from the AND circuit AND_A1 to output it to the flip-flop FF_A1 when the output signal from the OR circuit OR_CM is a low level, and the selector SEL_A1 selects an output signal from the flip-flop FF_A2 to output it to the flip-flop FF_A1 when the output signal from the OR circuit OR_CM is a high level.

The selector SEL_B1 selects an output signal from the AND circuit AND_B1 to output it to the flip-flop FF_B1 when the output signal from the OR circuit OR_CM is a low level, and the selector SEL_B1 selects an output signal from the flip-flop FF_B2 to output it to the flip-flop FF_B1 when the output signal from the OR circuit OR_CM is a high level.

When switching the clock, in the case when the clock signal at the switching destination (for example, the clock signal CLK_B) is stopped due to any reason, this embodiment keeps supplying the original clock signal (for example, the clock signal CLK_A) without performing switching operation actually even when the clock selection signal SEL is changed. The switching prohibition circuit 1201 is to make the selection signals in the selectors SEL_A1 and SEL_B1 (the output signal from the OR circuit OR_CM) a high level to keep the input signals to the gated clock buffers GCLK_A and GCLK_B in a preceding state until the change of the clock selection signal SEL is detected and the clock selection signal SEL is carried to each of the flip-flops FF_CA1, FF_CA2, FF_CB1, and FF_CB2. Then, when the clock selection signal SEL is propagated to the output of the flip-flops FF_CA2 and FF_CB2 properly, the output signal from the OR circuit OR_CM becomes a low level. Accordingly, the selectors SEL_A1 and SEL_B1 are switched, and the original clock selection signal SEL is carried to the flip-flops FF_A1, FF_A2, FF_B1, and FF_B2. Note that, in order to detect the state of the clock signal at the switching destination without omission, it is desirable that the circuit is configured such that initial values of the flip-flops FF_CB1 and FF_CB2 in the switching prohibition circuit 1201 are set to be initial values of the flip-flops FF_CA1 and FF_CA2.

According to such a circuit configuration, in the case when the clock signal at the switching destination is stopped tentatively, the output signal from the OR circuit OR_CM is kept in a high level state as depicted in FIG. 13. Therefore, even when the clock selection signal SEL is changed, the actual switching operation is not performed but the operation to keep outputting the original clock signal is performed. According to this embodiment, in the case when the clock signal at the switching destination is stopped, as depicted in FIG. 23, a clock stopped period 2301 does not occur, and the appropriate clock signal SEL_CLK can be kept output.

Note that this embodiment can apply not only to the first embodiment but also to the second to fifth embodiments.

Seventh Embodiment

Figure 14:
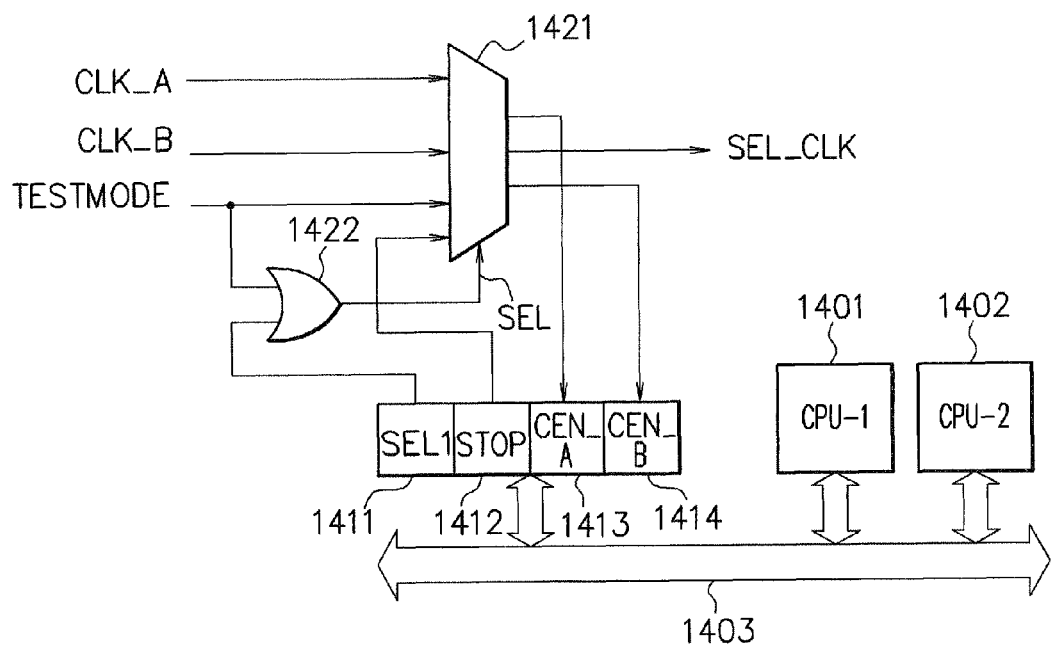
FIG. 14 is a view depicting a constitution example of a system including a clock signal selection circuit according to a seventh embodiment.
Figure 15:
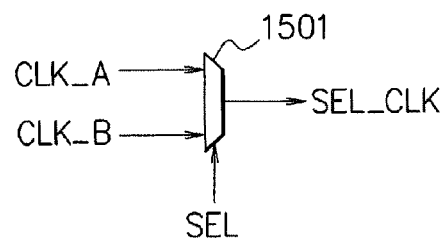
FIG. 15 is a circuit diagram depicting a configuration example of a clock signal selection circuit.
Figure 16:
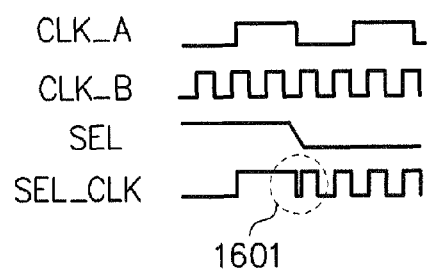
FIG. 16 is a timing chart depicting an operation of the clock signal selection circuit in FIG. 15.
Figure 17:
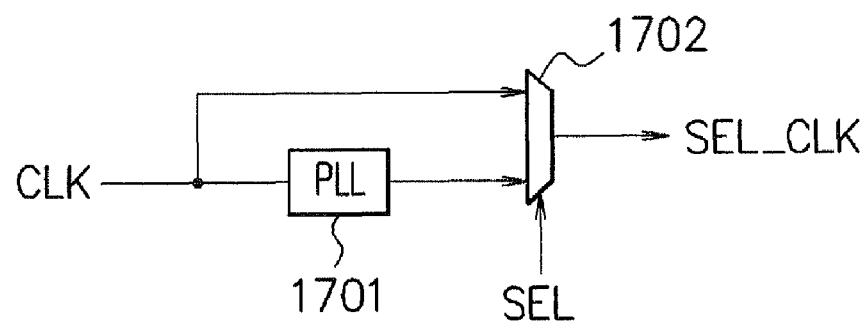
FIG. 17 is a circuit diagram depicting a configuration example of another clock signal selection circuit.
Figure 18:
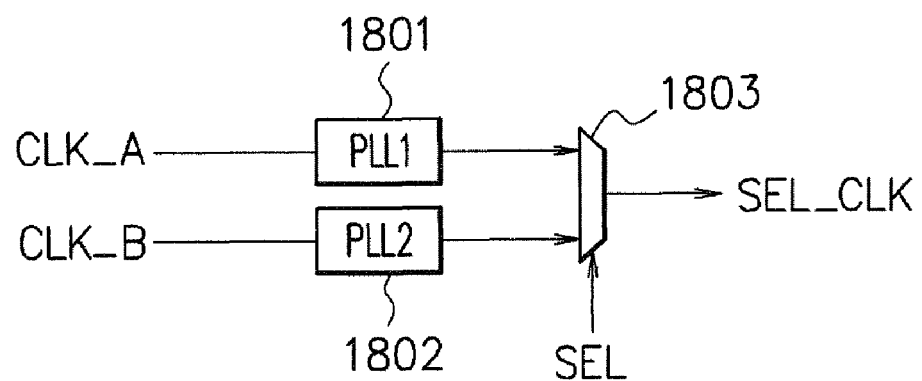
FIG. 18 is a circuit diagram depicting a configuration example of another clock signal selection circuit.
Figure 19:
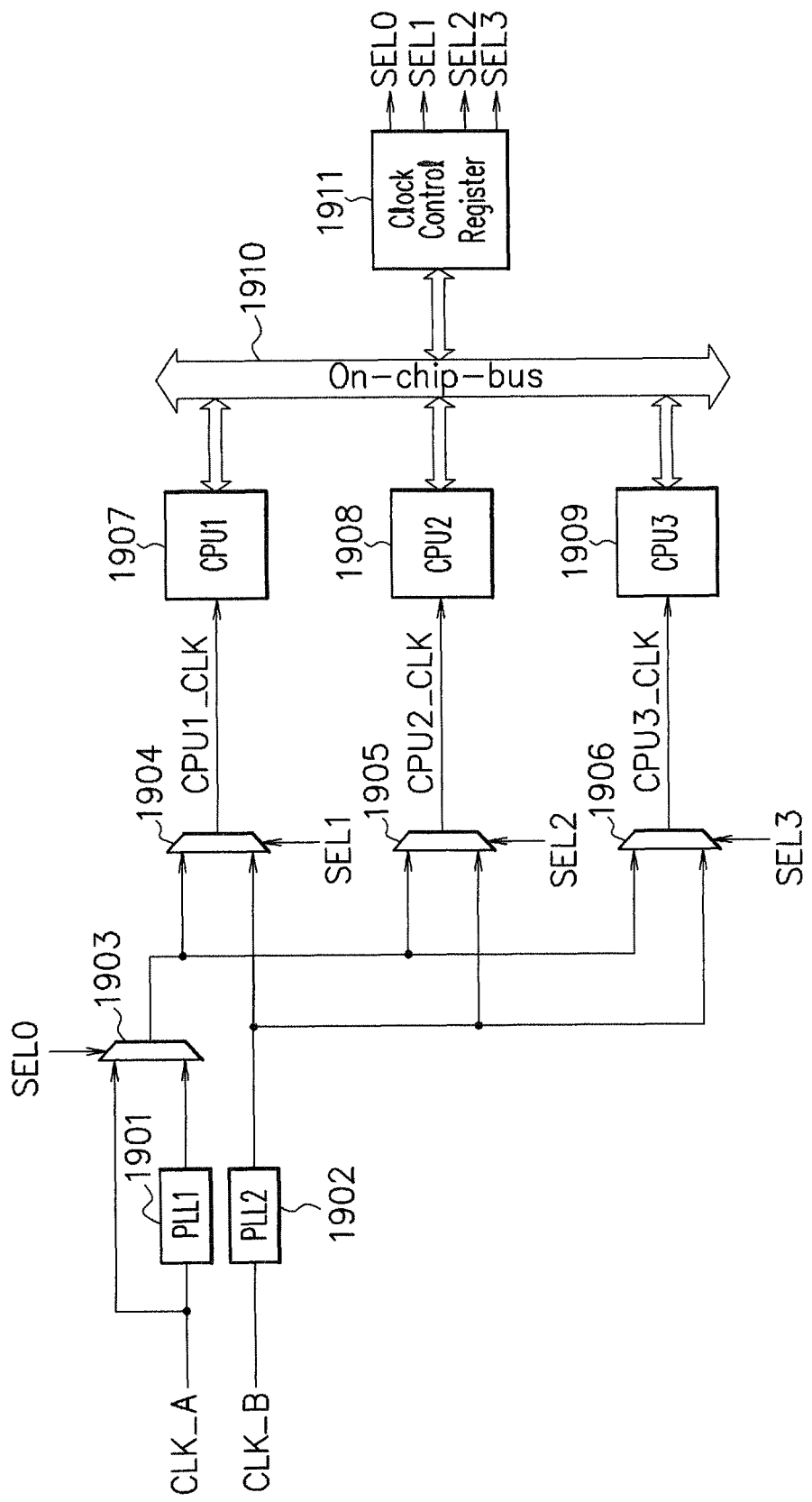
FIG. 19 is a circuit diagram depicting a configuration example of another clock signal selection circuit.
Figure 20:
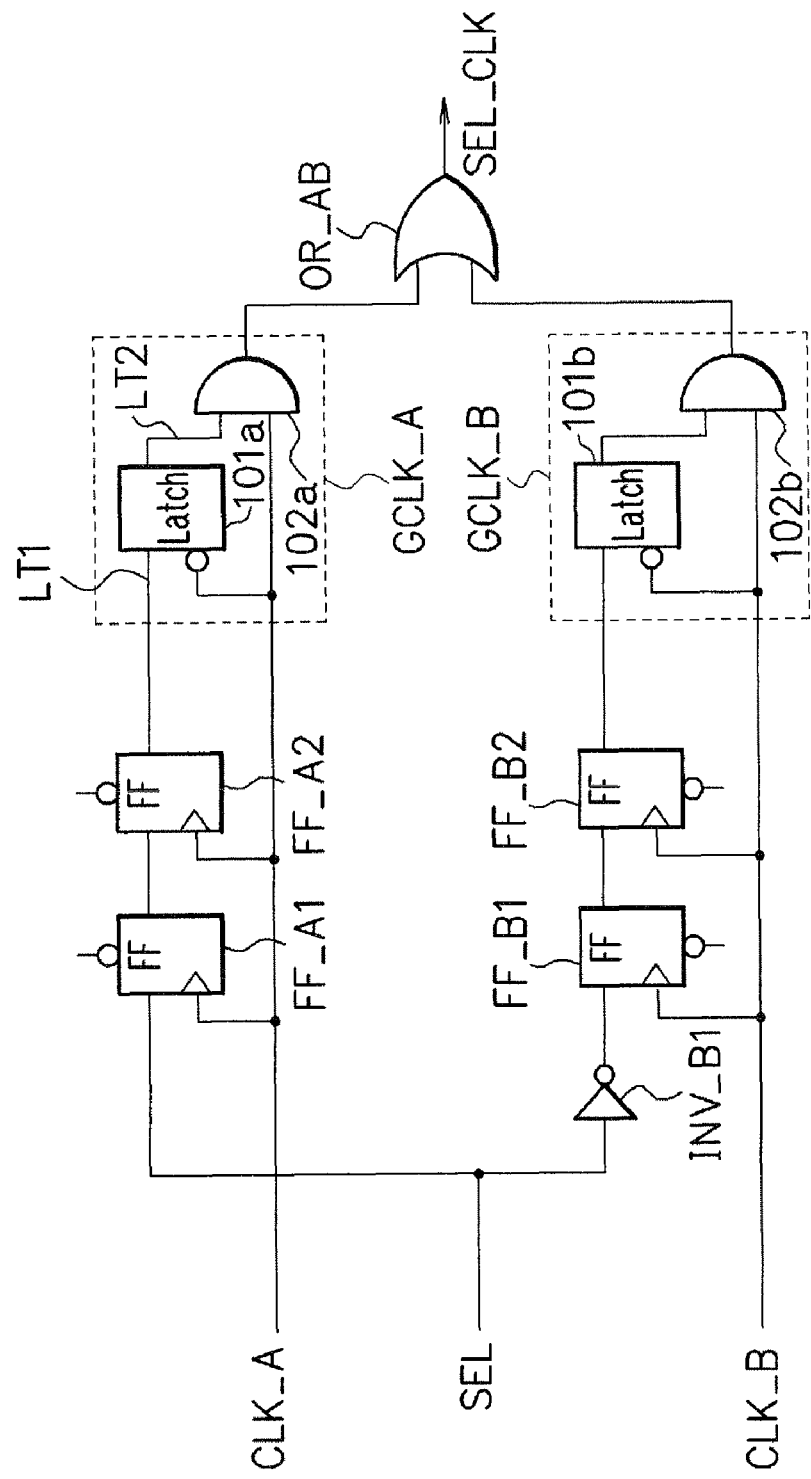
FIG. 20 is a circuit diagram depicting a configuration example of another clock signal selection circuit.
Figure 21:
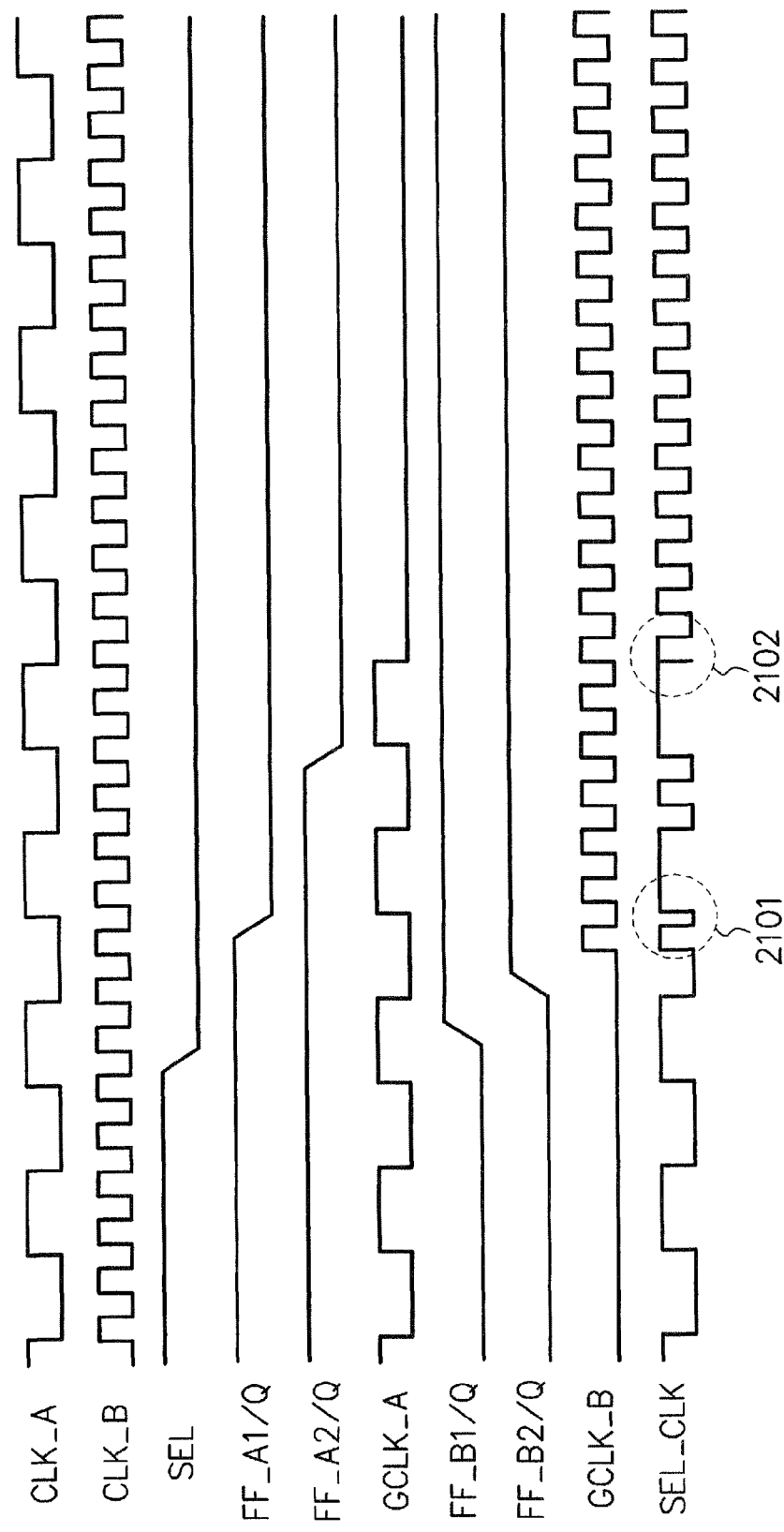
FIG. 21 is a timing chart depicting an operation of the clock signal selection circuit in FIG. 20.

FIG. 14 is a view depicting a constitution example of a system including a clock signal selection circuit according to a seventh embodiment. A first central processing unit (CPU) 1401, a second CPU 1402, and the clock control registers 1411 to 1414 are connected to a bus 1403. The clock control registers 1411 to 1414 are not necessary to be four registers 1411 to 1414, but the single register may have four fields 1411 to 1414 therein. A clock signal selection circuit 1421 is the clock signal selection circuit in the fifth embodiment. An OR circuit 1422 outputs a logical sum signal of a clock selection signal SELL that the clock control register 1411 outputs and the test mode signal TESTMODE to the clock signal selection circuit 1421 as the clock selection signal SEL. The clock control register 1412 outputs the clock stop signal STOP to the clock signal selection circuit 1421. The clock control register 1413 is a register for writing the monitor signal CEN_A that the clock signal selection circuit 1421 outputs therein. The clock control register 1414 is a register for writing the monitor signal CEN_B that the clock signal selection circuit 1421 outputs therein. The monitor signal CEN_A is the input signal to the gated clock buffer GCLK_A, and the monitor signal CEN_B is the input signal to the gated clock buffer GCLK_B.

As explained in the fifth embodiment, the clock control registers 1411 to 1414 are to be tested at the time of SCAN test, and storage contents are changed frequently in accordance with the test data. Thus, it is preferable to fix the clock selection signal SEL to either level when the test mode signal TESTMODE becomes a high level at the time of SCAN test. Providing the OR circuit 1422 can always make the clock selection signal SEL a high level when the test mode signal TESTMODE is a high level. Note that it may be configured such that the clock selection signal SEL is made to be a low level.

The CPUs 1401 and 1402 can perform writing and reading to/from the clock control registers 1411 to 1414 through the bus 1403. Either the CPU 1401 or the CPU 1402 can select either the first clock signal CLK_A or the second clock signal CLK_B to output the clock signal SEL_CLK by writing the clock selection signal SEL1 in the register 1411, and either the CPU 1401 or the CPU 1402 inputs the clock signal SEL_CLK to operate. The CPUs 1401 and 1402 can comprehend a kind of the clock signal input therein easily by reading the monitor signals CEN_A and CEN_B recorded in the registers 1413 and 1414.

This embodiment indicates the case where a plurality of CPUs such as the CPUs 1401 and 1402 control the clock signal selection circuit 1421, the clock control registers 1411 to 1414 that control the clock signal selection circuit 1421, and a control program. The clock signal selection circuit 1421 is not limited to the clock signal selection circuit in the fifth embodiment, but it may be the clock signal selection circuit in another embodiment. Further, the clock control registers 1411 to 1414 may be controlled by a specific control circuit except the CPU. Normal clock switching is performed such that either the CPU 1401 or the CPU 1402 writes a predetermined value in the clock control register 1411 through the bus 1403. Either the CPU 1401 or the CPU 1402 can confirm whether the clock signal is switched properly via the registers 1413 and 1414. Further, the case when the clock signal SEL_CLK is stopped also can be performed by which either the CPU 1401 or the CPU 1402 writes a predetermined value in the clock control register 1412. Whether the clock signal SEL_CLK is actually stopped after the clock signal SEL_CLK is made to be stopped can be confirmed by which either the CPU 1401 or the CPU 1402 reads the monitor signals CEN_A and CEN_B recorded in the registers 1413 and 1414.

Then, at the time of SCAN test (for example, in the case of the test mode signal TESTMODE being a high level), and the like, logic of the clock selection signal SELL and the test mode signal TESTMODE is taken so that the clock selection signal SEL to the clock signal selection circuit 1421 is fixed regardless of the value of the clock selection signal SELL output from the clock control register 1411. In the case when it is the logical sum, the clock selection signal SEL can be fixed to a high level, and in the case when it is the logical product, the clock selection signal SEL can be fixed to a low level. The clock signal selection circuit 1421 can keep outputting a predetermined clock signal (the clock signal CLK_A in the case of, for example, FIG. 11) at the time of SCAN test.

Note that there is no problem even when all of the flip-flops that configure all of the clock signal selection circuits in the first to seventh embodiments are configured to be reset/preset in an inverted manner. In the case, the clock to be selected at the time of reset is inverted.

According to the first to seventh embodiments, the effect in which the glitch does not occur at the time of clock switching can be obtained. Further, in the case when the clock signal at the switching destination is stopped, the circuit in FIG. 12 does not actually perform the switching operation but keeps supplying the original clock signal, and thereby hang-up of the CPU can be prevented. Further, the circuit in FIG. 14 is configured such that the clock signal being selected actually can be referred in the registers 1413 and 1414, and thereby whether clock switching is performed properly can be confirmed. The first to seventh embodiments can be applied to an LSI capable of controlling a frequency of a supply clock signal to a specific module dynamically, and can select an asynchronous clock signal dynamically when a clock frequency is switched.

Note that the above-described embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A clock signal selection circuit comprising:
   a first AND circuit outputting a logical product signal of a clock selection signal and a first control signal;
   a second AND circuit outputting a logical product signal of a logical inversion signal of the clock selection signal and a second control signal;
   a first flip-flop inputting either the logical product signal that the first AND circuit outputs or a signal in accordance with the logical product signal and outputting a logical inversion signal of a first output signal in synchronization with a first clock signal to the second AND circuit as the second control signal;
   a first gated clock buffer inputting either the input signal to the first flip-flop or a signal in accordance with the input signal and gate-controlling the input signal by the first clock signal to output a third clock signal;
   a second flip-flop inputting either the logical product signal that the second AND circuit outputs or a signal in accordance with the logical product signal and outputting a logical inversion signal of a second output signal in synchronization with a second clock signal to the first AND circuit as the first control signal;
   a second gated clock buffer inputting either the input signal to the second flip-flop or a signal in accordance with the input signal and gate-controlling the input signal by the second clock signal to output a fourth clock signal;
   a first OR circuit outputting a logical sum signal of the third and fourth clock signals;
   a third flip-flop inputting the logical product signal that the first AND signal outputs and outputting an output signal in synchronization with the first clock signal; and
   a fourth flip-flop inputting the logical product signal that the second AND signal outputs and outputting an output signal in synchronization with the second clock signal, and wherein
   the first flip-flop inputs either the output signal that the third flip-flop outputs or a signal in accordance with the output signal and
   the second flip-flop inputs either the output signal that the fourth flip-flop outputs or a signal in accordance with the output signal.

2. The clock signal selection circuit according to claim 1, further comprising:
   a third AND circuit outputting a logical product signal of the output signal from the third flip-flop and the first output signal;
   a fourth AND circuit outputting a logical product signal of the output signal from the fourth flip-flop and the second output signal, and wherein
   the first gated clock buffer inputs the logical product signal that the third AND circuit outputs and
   the second gated clock buffer inputs the logical product signal that the fourth AND circuit outputs.

3. The clock signal selection circuit according to claim 2, wherein
   the first gated clock buffer comprises:
   a first latch circuit inputting the logical product signal that the third AND circuit outputs and making the signal input in accordance with a level of the first clock signal pass therethrough to output it; and
   a fifth AND circuit outputting a logical product signal of the output signal from the first latch circuit and the first clock signal,
   the second gated clock buffer comprises:
   a second latch circuit inputting the logical product signal that the fourth AND circuit outputs and making the signal input in accordance with a level of the second clock signal pass therethrough to output it; and
   a sixth AND circuit outputting a logical product signal of the output signal from the second latch circuit and the second clock signal, and
   the first OR circuit outputs a logical sum signal of the signals that the fifth and sixth AND circuits output.

4. The clock signal selection circuit according to claim 2, wherein
   the first flip-flop inputs the output signal that the third flip-flop outputs via the fifth flip-flop, and the second flip-flop inputs the output signal that the fourth flip-flop outputs via the sixth flip-flop.

5. The clock signal selection circuit according to claim 4, wherein
the first gated clock buffer comprises:
a first latch circuit inputting the logical product signal that the third AND circuit outputs and making the signal input in accordance with a level of the first clock signal pass therethrough to output it; and
a fifth AND circuit outputting a logical product signal of the output signal from the first latch circuit and the first clock signal,
the second gated clock buffer comprises:
a second latch circuit inputting the logical product signal that the fourth AND circuit outputs and making the signal input in accordance with a level of the second clock signal pass therethrough to output it; and
a sixth AND circuit outputting a logical product signal of the output signal from the second latch circuit and the second clock signal, and
the first OR circuit outputs a logical sum signal of the signals that the fifth and sixth AND circuits output.

6. The clock signal selection circuit according to claim 1, wherein
the first gated clock buffer inputs the input signal to the first flip-flop, and
the second gated clock buffer inputs the input signal to the second flip-flop.

7. The clock signal selection circuit according to claim 6, wherein
the first flip-flop inputs the output signal that the third flip-flop outputs via the flip-flop, and
the second flip-flop inputs the output signal that the fourth flip-flop outputs via the flip-flop.

8. The clock signal selection circuit according to claim 7, wherein
the first gated clock buffer comprises:
a first latch circuit inputting the input signal to the first flip-flop and making the signal input in accordance with a level of the first clock signal pass therethrough to output it; and
a third AND circuit outputting a logical product signal of the output signal from the first latch circuit and the first clock signal,
the second gated clock buffer comprises:
a second latch circuit inputting the input signal to the second flip-flop and making the signal input in accordance with a level of the second clock signal pass therethrough to output it; and
a fourth AND circuit outputting a logical product signal of the output signal from the second latch circuit and the second clock signal, and
the first OR circuit outputs a logical sum signal of the signals that the third and fourth AND circuits output.

9. The clock signal selection circuit according to claim 7, wherein
the first gated clock buffer comprises a third AND circuit outputting a logical product signal of the input signal to the first flip-flop and the first clock signal,
the second gated clock buffer comprises a fourth AND circuit outputting a logical product signal of the input signal to the second flip-flop and the second clock signal, and
the first OR circuit outputs a logical sum signal of the signals that the third and fourth AND circuits output.

10. A clock signal selection circuit comprising:
a first AND circuit outputting a logical product signal of a clock selection signal and a first control signal;
a second AND circuit outputting a logical product signal of a logical inversion signal of the clock selection signal and a second control signal;
a first flip-flop inputting either the logical product signal that the first AND circuit outputs or a signal in accordance with the logical product signal and outputting a logical inversion signal of a first output signal in synchronization with a first clock signal to the second AND circuit as the second control signal;
a first gated clock buffer inputting either the input signal to the first flip-flop or a signal in accordance with the input signal and gate-controlling the input signal by the first clock signal to output a third clock signal;
a second flip-flop inputting either the logical product signal that the second AND circuit outputs or a signal in accordance with the logical product signal and outputting a logical inversion signal of a second output signal in synchronization with a second clock signal to the first AND circuit as the first control signal;
a second gated clock buffer inputting either the input signal to the second flip-flop or a signal in accordance with the input signal and gate-controlling the input signal by the second clock signal to output a fourth clock signal;
a first OR circuit outputting a logical sum signal of the third and fourth clock signals; and
a clock stop setting circuit setting input signals to the first and second gated clock buffers to be a low level regardless of the clock selection signal when a clock stop signal is input.

11. The clock signal selection circuit according to claim 10, further comprising:
a register outputting the clock stop signal.

12. The clock signal selection circuit according to claim 11, wherein
the register is connected to the central processing unit through the bus.

13. A clock signal selection circuit comprising:
a first AND circuit outputting a logical product signal of a clock selection signal and a first control signal;
a second AND circuit outputting a logical product signal of a logical inversion signal of the clock selection signal and a second control signal;
a first flip-flop inputting either the logical product signal that the first AND circuit outputs or a signal in accordance with the logical product signal and outputting a logical inversion signal of a first output signal in synchronization with a first clock signal to the second AND circuit as the second control signal;
a first gated clock buffer inputting either the input signal to the first flip-flop or a signal in accordance with the input signal and gate-controlling the input signal by the first clock signal to output a third clock signal;
a second flip-flop inputting either the logical product signal that the second AND circuit outputs or a signal in accordance with the logical product signal and outputting a logical inversion signal of a second output signal in synchronization with a second clock signal to the first AND circuit as the first control signal;
a second gated clock buffer inputting either the input signal to the second flip-flop or a signal in accordance with the input signal and gate-controlling the input signal by the second clock signal to output a fourth clock signal;
a first OR circuit outputting a logical sum signal of the third and fourth clock signals; and a switching prohibition circuit prohibiting output from switching from the second clock signal to the first clock signal when the first clock signal is stopped, and prohibiting output from switching from the first clock signal to the second clock signal when the second clock signal is stopped.

14. A clock signal selection circuit comprising:

a first AND circuit outputting a logical product signal of a clock selection signal and a first control signal;

a second AND circuit outputting a logical product signal of a logical inversion signal of the clock selection signal and a second control signal;

a first flip-flop inputting either the logical product signal that the first AND circuit outputs or a signal in accordance with the logical product signal and outputting a logical inversion signal of a first output signal in synchronization with a first clock signal to the second AND circuit as the second control signal;

a first gated clock buffer inputting either the input signal to the first flip-flop or a signal in accordance with the input signal and gate-controlling the input signal by the first clock signal to output a third clock signal;

a second flip-flop inputting either the logical product signal that the second AND circuit outputs or a signal in accordance with the logical product signal and outputting a logical inversion signal of a second output signal in synchronization with a second clock signal to the first AND circuit as the first control signal;

a second gated clock buffer inputting either the input signal to the second flip-flop or a signal in accordance with the input signal and gate-controlling the input signal by the second clock signal to output a fourth clock signal;

a first OR circuit outputting a logical sum signal of the third and fourth clock signals; and a register writing input signals to the first and second gated clock buffers therein.

15. The clock signal selection circuit according to claim 14, wherein a signal written in the register is read by a central processing unit through a bus.

16. The clock signal selection circuit according to claim 15, wherein the register outputs the clock selection signal.

* * * * *